United States Patent
DiMaria et al.

(10) Patent No.: US 11,611,658 B2
(45) Date of Patent: Mar. 21, 2023

(54) SYSTEM AND METHOD FOR ADAPTIVE CLOUD CONVERSATION PLATFORM

(71) Applicant: Virtual Hold Technology Solutions, LLC, Akron, OH (US)

(72) Inventors: Matthew DiMaria, Brentwood, TN (US); Matthew Donaldson Moller, Petaluma, CA (US); Shannon Lekas, Cushing, TX (US)

(73) Assignee: VIRTUAL HOLD TECHNOLOGY SOLUTIONS, LLC, Akron, OH (US)

( * ) Notice: Subject to any disclaimer, the term of this patent is extended or adjusted under 35 U.S.C. 154(b) by 0 days.

(21) Appl. No.: 17/893,006

(22) Filed: Aug. 22, 2022

(65) Prior Publication Data

US 2022/0400179 A1 Dec. 15, 2022

Related U.S. Application Data

(63) Continuation-in-part of application No. 17/358,331, filed on Jun. 25, 2021, which is a continuation-in-part of application No. 17/336,405, filed on Jun. 2, 2021, now Pat. No. 11,522,997, which is a continuation of application No. 17/011,248, filed on Sep. 3, 2020, now Pat. No. 11,032,424, which is a
(Continued)

(51) Int. Cl.
*H04M 3/523* (2006.01)
*H04L 67/306* (2022.01)
*H04M 3/51* (2006.01)

(52) U.S. Cl.
CPC ........ *H04M 3/5231* (2013.01); *H04L 67/306* (2013.01); *H04M 3/5183* (2013.01)

(58) Field of Classification Search
CPC .. H04M 3/5231; H04M 3/5183; H04L 67/306
USPC ............ 379/265.02, 265.01, 265.05, 265.11, 379/210.01, 265.12, 265.13
See application file for complete search history.

(56) References Cited

U.S. PATENT DOCUMENTS 10,051,011 B2 8/2018 Boerjesson et al.
2006/0095575 A1* 5/2006 Sureka ................ H04M 3/5322
709/227
(Continued)

*Primary Examiner* — Thjuan K Addy
(74) *Attorney, Agent, or Firm* — Galvin Patent Law LLC; Brian R. Galvin

(57) ABSTRACT

An adaptive cloud conversation platform capable of making automated decisions regarding when and how to establish ongoing communications with consumers so as to maximize the relationship between the consumer and a given brand. The system has a connection management services layer which determines what communications should be established and how they should be established, an initiation management services layer which determines when communications should be established, and a user management services layer which stores information about consumers and brands for determination of when and how communications should be established. Certain of these services have machine learning algorithms incorporated into them trained to perform analyses of the particular type of operation handled by that service. The outputs of each service can be used as inputs to other services, such that a network of machine learnings algorithms is created which determines when and how to establish ongoing communications with consumers.

16 Claims, 21 Drawing Sheets

Related U.S. Application Data continuation-in-part of application No. 16/995,424, filed on Aug. 17, 2020, now abandoned, which is a continuation-in-part of application No. 16/896,108, filed on Jun. 8, 2020, now abandoned, which is a continuation-in-part of application No. 16/836,798, filed on Mar. 31, 2020, now Pat. No. 10,992,811, which is a continuation of application No. 16/542,577, filed on Aug. 16, 2019, now Pat. No. 10,609,218, said application No. 16/896,108 is a continuation-in-part of application No. 16/152,403, filed on Oct. 4, 2018, now abandoned, said application No. 16/058,044 is a continuation-in-part of application No. 14/532,001, filed on Nov. 4, 2014, now Pat. No. 10,375,245, which is a continuation-in-part of application No. 13/659,902, filed on Oct. 24, 2012, now Pat. No. 8,938,221, which is a continuation-in-part of application No. 13/479,870, filed on May 24, 2012, now Pat. No. 9,055,149, which is a continuation-in-part of application No. 12/320,517, filed on Jan. 28, 2009, now Pat. No. 8,213,911, said application No. 13/659,902 is a continuation-in-part of application No. 13/446,758, filed on Apr. 13, 2012, now Pat. No. 8,792,866, which is a continuation of application No. 12/320,517, filed on Jan. 28, 2009, now Pat. No. 8,213,911, said application No. 17/358,331 is a continuation-in-part of application No. 16/591,096, which is a continuation of application No. 15/411,534, filed on Jan. 20, 2017, now Pat. No. 10,455,090, application No. 17/893,006, which is a continuation of application No. 17/235,408, filed on Apr. 20, 2021, now Pat. No. 11,489,964, which is a continuation of application No. 16/836,798, filed on Mar. 31, 2020, now Pat. No. 10,992,811.

(60) Provisional application No. 62/858,454, filed on Jun. 7, 2019, provisional application No. 62/820,190, filed on Mar. 18, 2019, provisional application No. 62/291,049, filed on Feb. 4, 2016.

(56) References Cited

U.S. PATENT DOCUMENTS

| | | | |
|---|---|---|---|
| 2006/0256949 A1 | 11/2006 | Noble | |
| 2012/0106728 A1* | 5/2012 | Ghaffari | H04M 7/0033 379/211.02 |
| 2014/0378110 A1* | 12/2014 | Chingon | H04W 4/023 379/201.03 |

* cited by examiner

Machine Learning Algorithm Training and Operation for Event Context Analysis

Callback Use Case Examples
Standard Callback
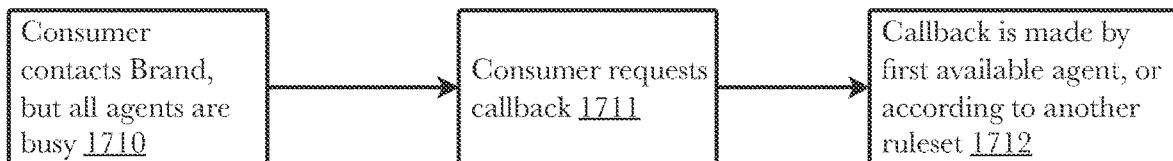
Proactive Callback
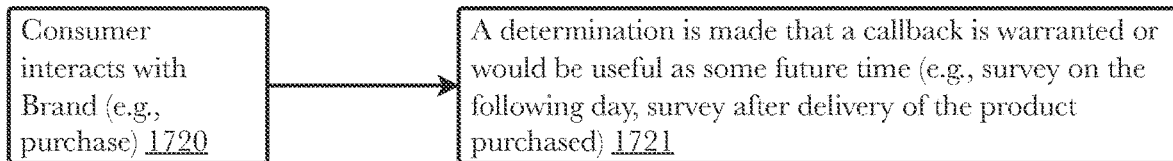
Media-Switching Callback
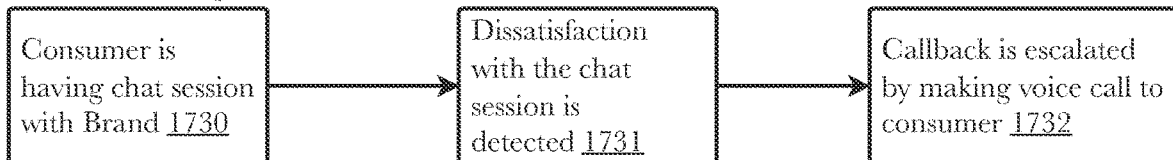
Consumer Event-Based Callback
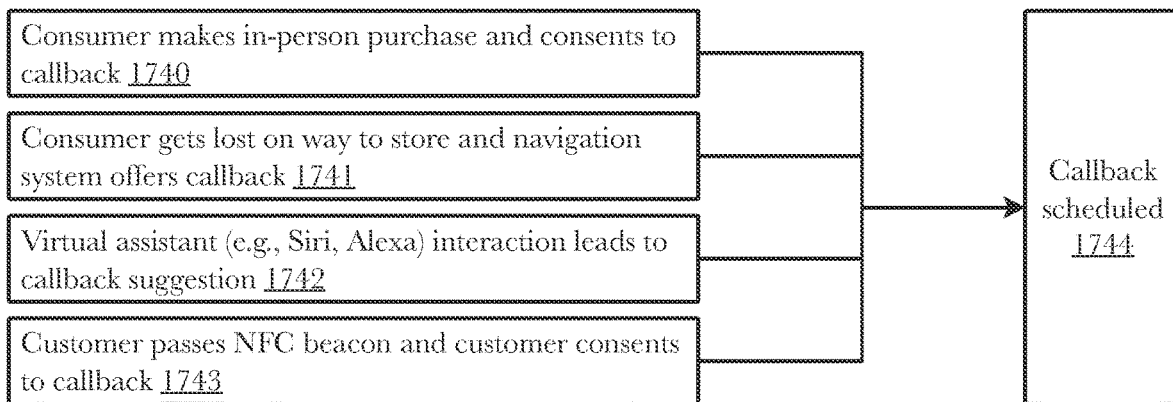
Rule-Based Callback
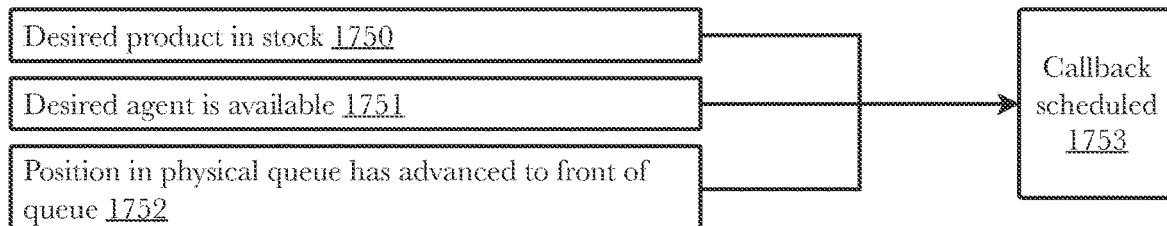
FIG. 17 ns is created which, when operated together, deter-
SYSTEM AND METHOD FOR ADAPTIVE CLOUD CONVERSATION PLATFORM Priority is claimed in the application data sheet to the following patents or patent applications, the entire written description of each of which is expressly incorporated herein by reference in its entirety:
  Ser. No. 17/235,408
  Ser. No. 17/358,331
  Ser. No. 16/836,798
  Ser. No. 16/591,096
  Ser. No. 17/336,405
  Ser. No. 17/011,248
  Ser. No. 16/995,424
  Ser. No. 16/896,108
  Ser. No. 16/542,577
  62/820,190
  62/858,454
  Ser. No. 16/152,403
  Ser. No. 16/058,044
  Ser. No. 14/532,001
  Ser. No. 13/659,902
  Ser. No. 13/479,870
  Ser. No. 12/320,517
  Ser. No. 13/446,758
  Ser. No. 15/411,534
  62/291,049

BACKGROUND OF THE INVENTION

Field of the Art

The disclosure relates to the field of contact center technology, specifically to the field of cloud-implemented automated callback systems.

Discussion of the State of the Art

While various types of callback scheduling systems exist, they are limited to basic scheduling functions such as queuing for callbacks by the next available agent or callbacks based on consumer indications of appropriate callback times. These systems can keep track of repeated interactions with consumers either by identifying the consumer's phone number or account, or by assigning repeated interactions to ticket numbers specific to a particular reason for the interaction. However, other than tracking these repeated interactions so that agents can see the history of interactions, these systems do not account for the complexity of ongoing conversations with consumers and have no ability to determine when and how to establish further communications with consumers so as to maximize the relationship between the consumer and a given brand.

What is needed is an adaptive cloud conversation platform capable of automated decisions regarding when and how to establish ongoing communications with consumers so as to maximize the relationship between the consumer and a given brand.

SUMMARY OF THE INVENTION

Accordingly, the inventor has conceived and reduced to practice, an adaptive cloud conversation platform capable of making automated decisions regarding when and how to establish ongoing communications with consumers so as to maximize the relationship between the consumer and a given brand. In an embodiment, the system comprises a connection management services layer which determines what communications should be established and how they should be established, an initiation management services layer which determines when communications should be established, and a user management services layer which stores information about consumers and brands for determination of when and how communications should be established. Certain of these services have machine learning algorithms incorporated into them trained to perform analyses of the particular type of operation handled by that service. The outputs of each service can be used as inputs to other services, such that a network of machine learnings algorithms is created which, when operated together, determines when and how to establish ongoing communications with consumers so as to maximize the relationship between the consumer and a given brand.

According to a preferred embodiment, an adaptive cloud conversation platform is disclosed, comprising: a computing device comprising a memory, a processor, and a non-volatile data storage device; a consumer profile database stored on the non-volatile data storage device, the consumer profile database comprising one or more consumer profiles; a conversation manager comprising a first plurality of programming instructions stored in the memory which, when operating on the processor, causes the computing device to: receive a determination that a callback should be made to a consumer; retrieve a consumer profile for the consumer from the consumer profile database, the consumer profile comprising a plurality of behaviors of the consumer and a plurality of preferences of the consumer; process the plurality of preferences through a first machine learning algorithm to select a channel through which to conduct the callback with the consumer; and forward the channel selection to a schedule manager; a schedule manager comprising a second plurality of programming instructions stored in the memory which, when operating on the processor, causes the computing device to: receive the channel selection from the consumer context manager; retrieve the consumer profile; process the plurality of preferences through a second machine learning algorithm to select a time at which to conduct the callback with the consumer through the selected channel; schedule a callback with the consumer at the selected time through the selected channel; and forward the callback schedule to a callback manager; and a callback manager comprising a third plurality of programming instructions stored in the memory which, when operating on the processor, causes the computing device to: receive the callback schedule; and execute the callback at the selected time through the selected channel as indicated in the callback schedule.

According to another preferred embodiment, a method for operating an adaptive cloud conversation platform is disclosed, comprising the steps of: using a conversation manager operating on a computing device comprising a memory, a processor, and a non-volatile data storage device to: receive a determination that a callback should be made to a consumer; retrieve a consumer profile for the consumer from the consumer profile database stored on the non-volatile data storage device, the consumer profile database comprising one or more consumer profiles, and the consumer profile comprising a plurality of behaviors of the consumer and a plurality of preferences of the consumer; process the plurality of preferences through a first machine learning algorithm to select a channel through which to conduct the callback with the consumer; and forward the channel selection to a schedule manager; using a schedule manager operating on the computing device to: receive the channel selection from the consumer context manager; retrieve the consumer profile; process the plurality of preferences through a second machine learning algorithm to select a time at which to conduct the callback with the consumer through the selected channel; schedule a callback with the consumer at the selected time through the selected channel; and forward the callback schedule to a callback manager; and using a callback manager operating on the computing device: receive the callback schedule; and execute the callback at the selected time through the selected channel as indicated in the callback schedule.

According to an aspect of an embodiment, a consumer context manager is used to: receive text from a conversation with a consumer; retrieve a consumer profile for the consumer from the consumer profile database, the consumer profile comprising a plurality of behaviors of the consumer and a plurality of preferences of the consumer; process the text and the plurality of behaviors of the consumer through a third machine learning algorithm to determine whether a callback to the consumer should be made; and where the determination is that a callback should be made, forward the determination to the conversation manager as the determination that a callback should be made to a consumer.

According to an aspect of an embodiment, a session manager is used to: receive the text; process the text through a fourth machine learning algorithm to determine a consumer sentiment; and forward the determined sentiment to the consumer context manager as an additional input to the third machine learning algorithm's determination as to whether a callback to the consumer should be made.

According to an aspect of an embodiment, the conversation manager is further configured to: process the text through a fifth machine learning algorithm to determine a consumer goal, need, or intent; and forward the determined goal, need, or intent to the consumer context manager as an additional input to the third machine learning algorithm's determination as to whether a callback to the consumer should be made.

According to an aspect of an embodiment, an event rules database is stored on the non-volatile data storage device, the event rules database comprising rules for triggering communications with consumers based on events occurring outside of a conversation; and an event manager is used to: receive notification of an event; match the event to a rule in the event rules database; and forward the matched event to the conversation manager as the determination that a callback should be made to the consumer.

According to an aspect of an embodiment, the event manager is further configured to: retrieve the consumer profile for the consumer from the consumer profile database; process the consumer profile and one or more rules from the event rules database through a sixth machine learning algorithm to determine a new rule for triggering communications with the consumer; and store the new rule in the event rules database.

According to an aspect of an embodiment, a brand environment database is stored on the non-volatile data storage device, the brand environment database comprising brand information related to conversations with consumers of the brand; and an environment manager is used to: retrieve a consumer profile for a consumer from the consumer profile database; retrieve the brand information from the brand environment database; process the consumer profile and the brand information through a seventh machine learning algorithm to determine whether a campaign of communications should be established with a plurality of consumers; and forward the determination to the conversation manager as the determination that a callback should be made to the consumer.

According to an aspect of an embodiment, a consumer manager is used to: retrieve the consumer profile for the consumer from the consumer profile database; receive a fitness parameter from the environment manager; process the consumer profile and the fitness parameter through an eighth machine learning algorithm to identify opportunities for proactive conversations with the consumer; and forward the identified to the consumer context manager as an additional input to the first machine learning algorithm's selection of the channel through which the callback should be made.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

FIG. 17 is a flow diagram illustrating an exemplary use case examples for an adaptive cloud conversation platform.

DETAILED DESCRIPTION

Figure 1:
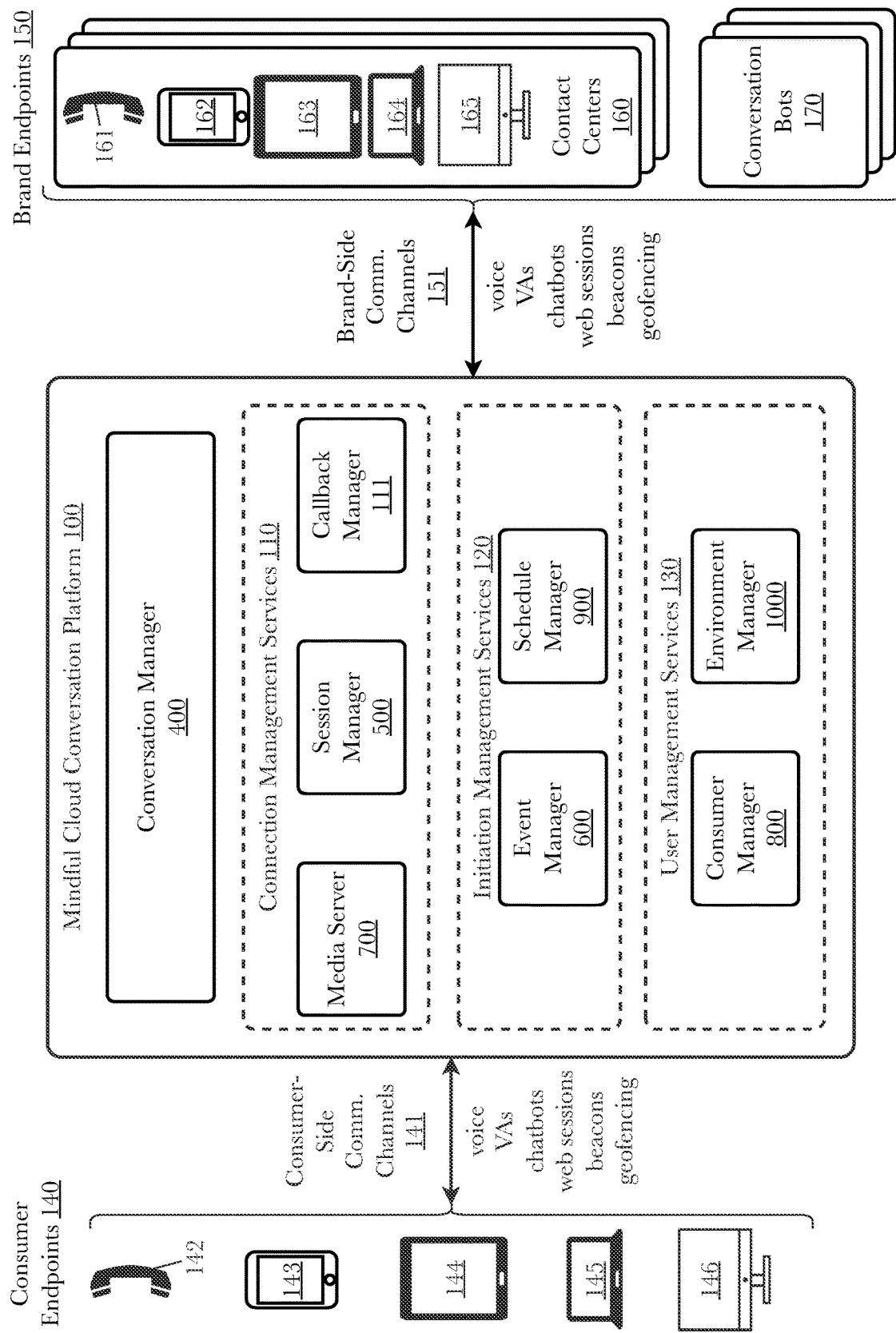
FIG. 1 is a block diagram illustrating an exemplary system architecture for an adaptive cloud conversation platform connected to brand endpoints comprising contact centers.

The inventor has conceived, and reduced to practice, an adaptive cloud conversation platform capable of making automated decisions regarding when and how to establish ongoing communications with consumers so as to maximize the relationship between the consumer and a given brand. In an embodiment, the system comprises a connection management services layer which determines what communications should be established and how they should be established, an initiation management services layer which determines when communications should be established, and a user management services layer which stores information about consumers and brands for determination of when and how communications should be established. Certain of these services have machine learning algorithms incorporated into them trained to perform analyses of the particular type of operation handled by that service. The outputs of each service can be used as inputs to other services, such that a network of machine learnings algorithms is created which, when operated together, determines when and how to establish ongoing communications with consumers so as to maximize the relationship between the consumer and a given brand.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

"Callback" as used herein refers to contact by a brand to a consumer after some interaction or attempted interaction between the consumer and the brand. The term callback is not limited to telephone communications, and includes any form of communication whether in person or via electronic means such as, but not limited to, phone, voice-over-Internet-protocol (VOIP), email, short message service (SMS), and online messaging platforms.

"Consumer" as used herein means a potential buyer or consumer of products and/or services. A consumer may be a person, group of persons, or a legal entity such as a company.

"Conversation" as used herein means a series of communications between at least one brand and at least one consumer. A conversation may comprise many sessions, may use many different forms of communication (e.g., phone, email, SMS), and may span long periods of time. In some cases, conversations may be grouped into themes (e.g., a "ticket" related to a problem as used in some technical service systems), but the term conversation as used herein is not so limited and may span any number of themes. A conversation involves communication between at least one consumer and one brand, but is not limited to communications between single brand and a single consumer, and may involve other brands or third parties, as well. For example, in a real estate transaction, a conversation may involve two consumers (a buyer and a seller), as well as multiple brands (the seller's agent or broker, the buyer's agent or broker, a lender, a title company, an escrow company, etc.).

"Session" as used herein means a single communication between at least one brand and at least one consumer. A session involves communication between at least one consumer and one brand, but is not limited to communications between single brand and a single consumer, and may involve other brands or third parties, as well. For example, in a real estate transaction, a session may involve two consumers (a buyer and a seller), as well as multiple brands (the seller's agent or broker, the buyer's agent or broker, a lender, a title company, an escrow company, etc.).

Conceptual Architecture

FIG. 1 is a block diagram illustrating an exemplary system architecture for an adaptive cloud conversation platform connected to brand endpoints comprising contact centers. The adaptive cloud conversation platform (ACCP) 100 is designed to provide automated, machine-learning-algorithm-supported complex conversation support to brands to establish, enhance, and maintain relationships with their consumers. Its capabilities exceed those of traditional callback systems or customer relationship management systems in that it is designed not just to keep records of past interactions between a given brand and a given consumer and schedule callbacks from the brand to the consumer, but to manage the entirety of complex conversations that may occur between consumers and brands, including conversations involving multiple consumers and multiple brands.

The adaptive cloud conversation platform 100, therefore, manages complex conversations, possibly over an extended period of time, between one or more brand endpoints 150 of a brand and one or more consumer endpoints 140 of a consumer or consumers. The consumer endpoints 140 may be any device used by a consumer for communications including, but not limited to plain old telephone service (POTS) 142, mobile phones or smartphones 143, tablet computers 144, laptop computers 145, and desktop computers 146. While not shown here, in-person communications (without devices) is also considered to be a consumer endpoint 140 (e.g., in some cases, the adaptive cloud conversation platform 100 may recommend in-person communications for certain sessions). Consumer-side communication channels 141 between the consumer endpoints 140 and the adaptive cloud conversation platform 100 may be established or triggered through any means supported by the consumer endpoints 140 including, but not limited to, voice, virtual assistants (VAs), chatbots, web sessions, electronic beacons placed in physical locations such as store displays, and geofenced triggers.

The brand endpoints 140 may be any device used by a consumer for communications including, but not limited to plain old telephone service (POTS) 161, mobile phones or smartphones 162, tablet computers 163, laptop computers 164, and desktop computers 165. While not shown here, in-person communications (without devices) is also considered to be a brand endpoint 140 (e.g., in some cases, the adaptive cloud conversation platform 100 may receive data from an in-person purchase at a brand-owned store). In this embodiment, the brand endpoints 150 are located at a contact center 160 which handles consumer relations for the brand, either as a brand-owned contact center or a third party contact center service. Further, the brand endpoints in some cases may be conversation bots 170 (also known as chatbots or interactive voice response (IVR) systems) instead of human agents. Brand-side communication channels 151 between the brand endpoints 150 and the adaptive cloud conversation platform 100 may be established or triggered through any means supported by the brand endpoints 150 including, but not limited to, voice, virtual assistants (VAs), chatbots, web sessions, electronic beacons placed in physical locations such as store displays, and geofenced triggers.

In this embodiment, the system can be conceived of as comprising a conversation manager 400, a connection management services layer 110, an initiation management services layer 120, and a user management services layer 130. However, certain components within each of these layers may perform some aspects of other layers, so there can be cross-over between layers in some cases. Further, in other embodiments, the functionalities of certain components described herein may be performed by other components, depending on platform configuration.

Conversation manager 400 is the component that determines the scope of each conversation and manages overall communications between the components at each layer accordingly, although data may still be passed directly from component to component. Connection management services layer 110 generally determines what communications should be established and how they should be established (often referred to herein as a "mode" of communications). The connection management services layer 110 comprises a media server 700 which establishes communications between consumer endpoints 140 and brand endpoints 150 and performs any necessary media translations (e.g., automated speech recognition, text to speech, etc.), a session manager 500 which assigns session identifiers, instructs the media server 700 to establish connections, and handles all incoming, outgoing, and stored data associated with each session, and a callback manager 111 which executes callbacks initiated by the initiation management services layer 120 by instructing the session manager 500 to initiate a callback.

Initiation management services layer 120 determines when communications should be established. Initiation management services layer 120 comprises an event manager 600 which initiates callbacks based on events occurring outside of a session, and a schedule manager 900 which determines when communications should be established and schedules callbacks based on the determinations. Callbacks initiated by the event manager 600 and schedule manager 900 are passed up to the connection management service layer 110 and executed by the callback manager 111.

User management services layer 130 stores information about consumers and brands for determination of when and how communications should be established. User management services layer 130 comprises a consumer manager 800 which manages the profiles of consumers for use in establishing effective conversations with them, and an environment manager 1000 which stores information about brands including operations information and analysis, locations and status of communications infrastructure, and customer relationship management (CRM) information, plus and event thrower which can trigger scheduling of callbacks by sending instructions up to initiation management services layer 120 for event rule establishment by the event manager 600 or scheduling by the schedule manager 900.

Certain of these services have machine learning algorithms incorporated into them trained to perform analyses of the particular type of operation handled by that service. The outputs of each service can be used as inputs to other services, such that a network of machine learnings algorithms is created which, when operated together, determines when and how to establish ongoing communications with consumers so as to maximize the relationship between the consumer and a given brand.

Figure 2:
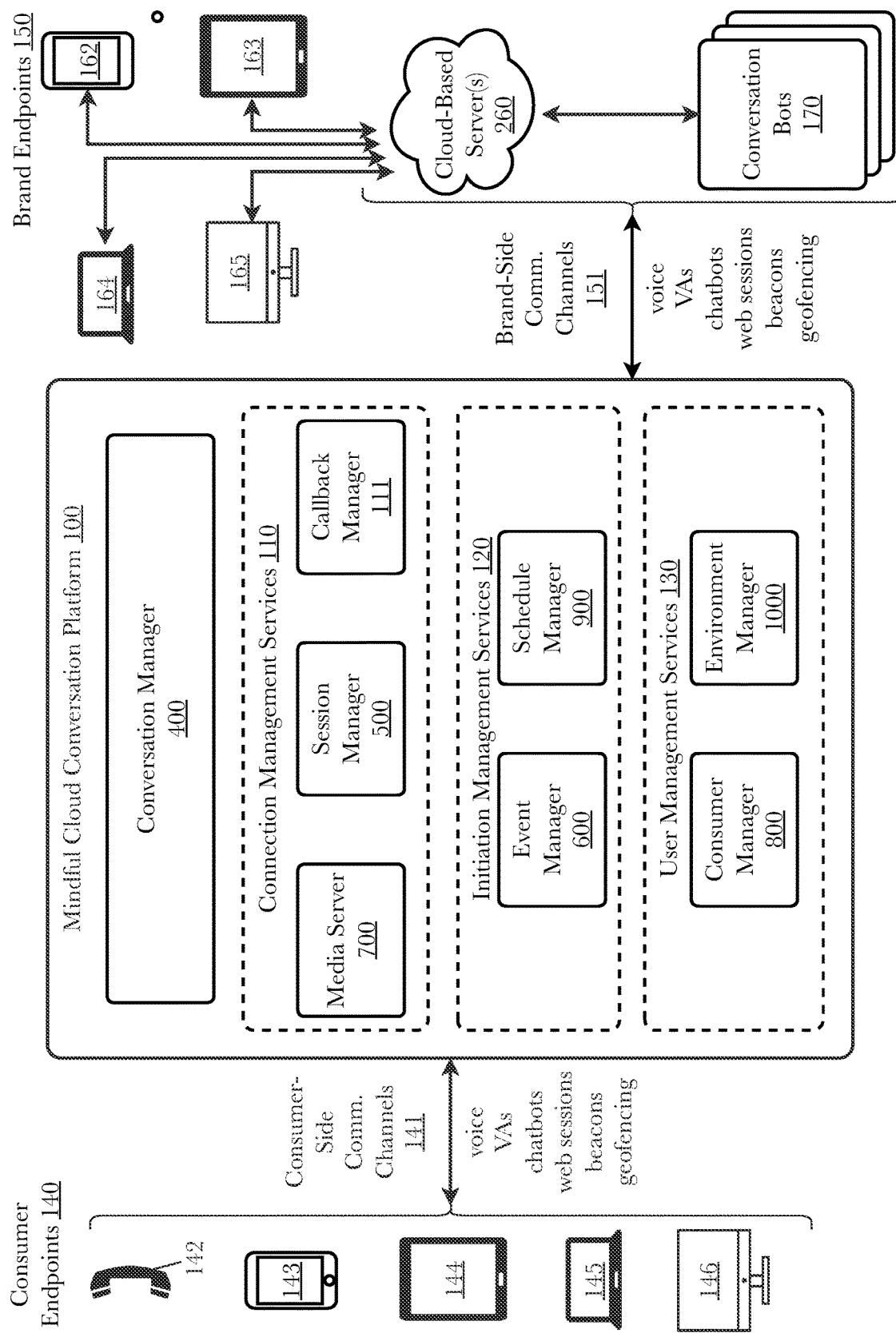
FIG. 2 is a block diagram illustrating an exemplary system architecture for an adaptive cloud conversation platform connected to brand endpoints comprising a cloud-based server with remote agents.

FIG. 2 is a block diagram illustrating an exemplary system architecture for an adaptive cloud conversation platform connected to brand endpoints comprising a cloud-based server with remote agents. In this embodiment, adaptive cloud conversation platform 100 is the same as described above in FIG. 1, but the interface with the brand endpoints is different. In this embodiment, brand endpoints 150 are remote agents managed through a cloud-based server 260 instead of being on-site agents at a contact center 160.

Figure 3:
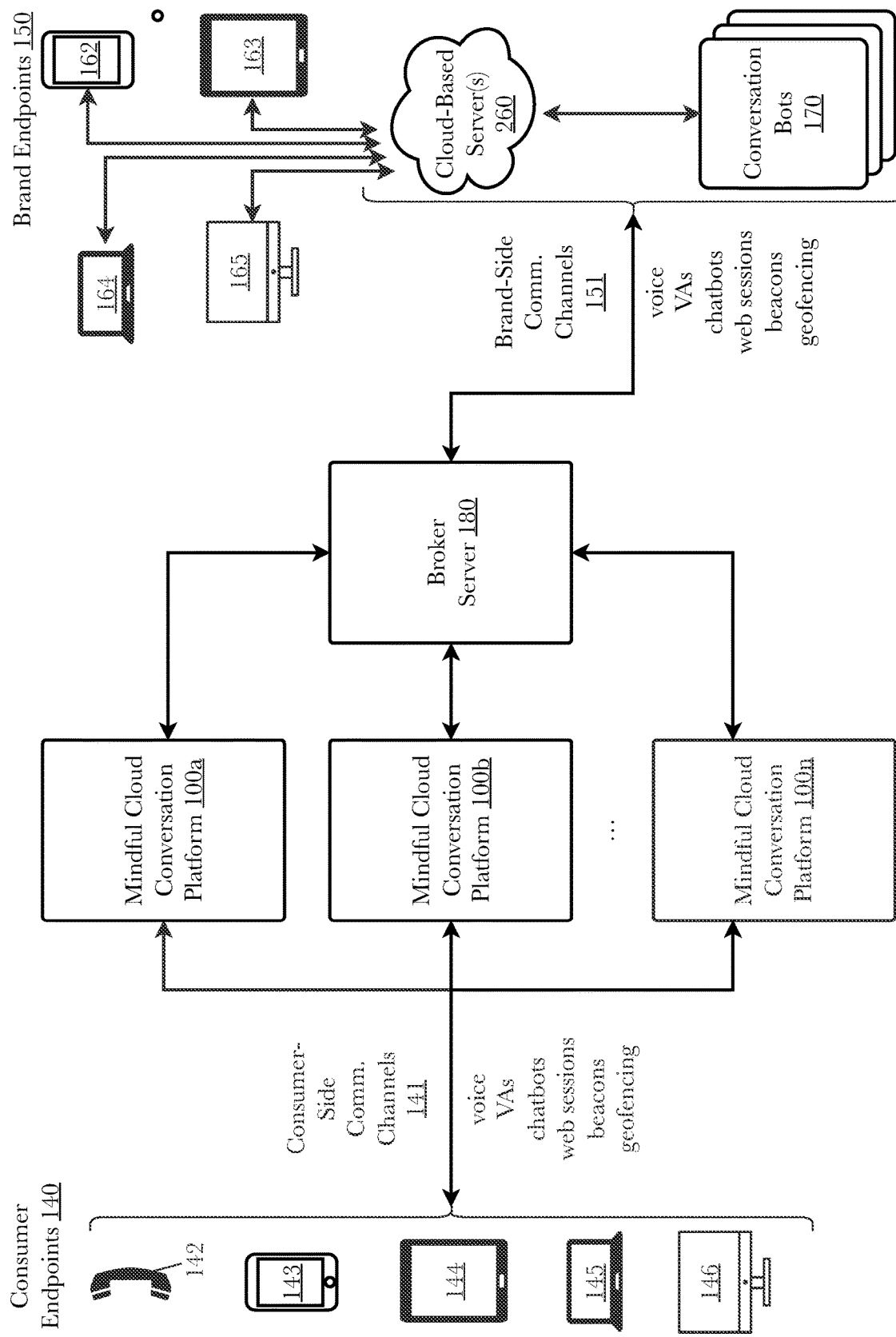
FIG. 3 is a block diagram illustrating an exemplary architecture for a multiple-instance adaptive cloud conversation platform connected to brand endpoints comprising a cloud-based server with remote agents and a broker server intermediary.

FIG. 3 is a block diagram illustrating an exemplary architecture for a multiple-instance adaptive cloud conversation platform connected to brand endpoints comprising a cloud-based server with remote agents and a broker server intermediary. In this embodiment, a plurality of adaptive cloud conversation platforms (ACCPs) 100a-n, each having capabilities the same as or similar to that described in FIG. 1, are managed by a broker server 180. In this embodiment, the broker server 180 mediates between brands and adaptive cloud conversation platform instances 100a-n. Depending on configuration, this embodiment supports a federated conversation arrangement where a consumer can interact with multiple brands through a single ACCP, or where one brand can use different ACCP instances to handle callbacks, or a combination of the two.

Figure 4:
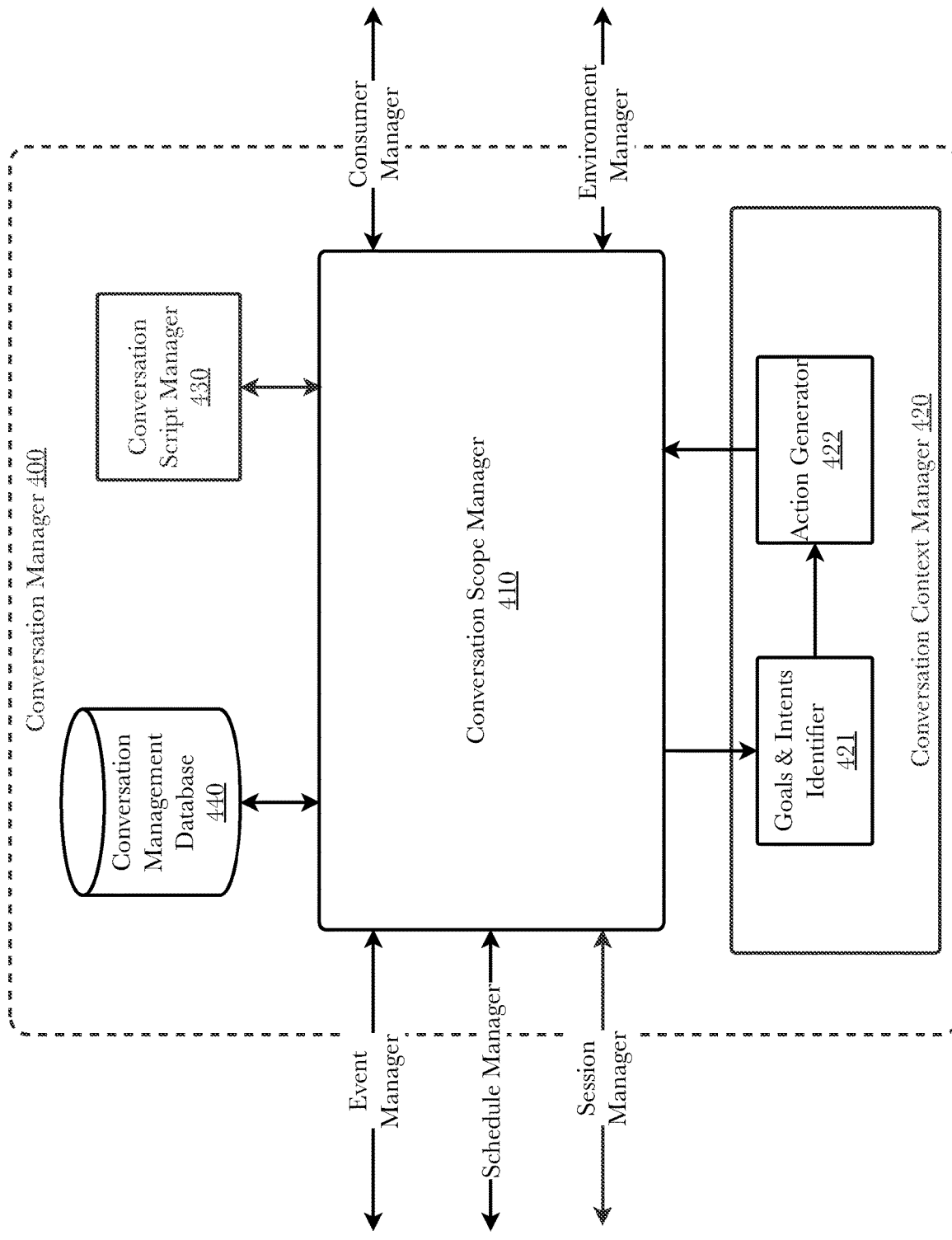
FIG. 4 is a block diagram illustrating an exemplary system architecture for a conversation manager aspect of an adaptive cloud conversation platform.

FIG. 4 is a block diagram illustrating an exemplary system architecture for a conversation manager aspect of an adaptive cloud conversation platform. The conversation manager 400 is responsible for determining the scope of conversations and for overall coordination of conversations with other components of the platform based on the scope. In this embodiment, the conversation manager 400 comprises a conversation scope manager 410, a conversation context manager 420, a conversation script manager 430, and a conversation management database 440.

The conversation scope manager 410 is responsible for determining and managing the scope of conversations. The conversation scope manager interfaces with other components of the system to either receive information about current or scheduled conversations or to direct initiation of conversations. In this embodiment, the conversation scope manager interfaces with the event manager to establish rules for triggering events and to receive notification of events that have been triggered, the schedule manager to schedule callbacks and receive notification of callbacks due for initiation, the session manager to initiate callbacks and receive data regarding ongoing callbacks, the consumer manager to store and retrieve consumer profile data, and the environment manager to receive brand-established rules, fitness parameters, and other brand-related information. As conversations may involve multiple themes, extend over many sessions and over extended periods of time, and may involve more than one consumer and/or more than one brand, the conversation scope manager 410 is responsible for determining the scope of a given conversation through the use of global and local variables. For example, consumers may be assigned a global variable such that they are recognized throughout all components of the platform and at all stages. However, local scope variables may be assigned for each conversation, session, event, brand campaign, etc., to decrease dependencies within the platform, to separate conversations, to decrease the likelihood of data corruption, and to reduce overall complexity of the platform. For example, if a conversation starts between a buyer's real estate agent (brand) and the buyer (consumer), a scope will be assigned to that conversation. If and when the conversation extends to include other parties such as a seller's real estate agent (brand) and the seller, the seller's agent and seller may be recognized by the platform due to their global scope, but will be incorporated into the conversation's local scope for purposes of negotiating and completing that particular real estate transaction. Other scope variables may be assigned, such as session scope variables for communications between parties within the overall scope of the conversation about the real estate transaction. The conversation scope manager 410 keeps track of conversations, sessions, participants, and scopes, and stores them in the conversation management database 440 for later use.

The conversation context manager 420 is responsible for analyzing the context of conversations and, in particular, for determining the goals, needs, or intents of consumers for the purpose of recommending an action (e.g., scheduling a callback, changing modes of conversation, etc.). The conversation context manager incorporates a trained machine learning algorithm which receives conversation related data and determines a goal, need, or intent of the consumer using a goals and intents identifier 421 and recommends a corresponding action using an action generator 422. The training and operation of the machine learning algorithm is described later herein. The output of the conversation context manager 420 may be fed to other components for actions to be taken (e.g., a recommendation to schedule a callback by phone with a particular agent may be sent to the schedule manager to schedule the callback) or may be fed to the machine learning algorithms of other components for further analysis (e.g., a determination that a customer is dissatisfied with the current line of discussions with an agent may be sent to the session context manager 520 for proposal of a different set of responses). In this way, the outputs of the machine learning algorithm(s) of each component of the platform may be acted on separately or may be used as part of a network of machine learning algorithms, or some combination of the two.

Conversation script manager 430 contains a library of conversation scripts against which transcripts of conversations may be compared for analysis purposes or from which conversation scripts can be drawn in order to respond to ongoing sessions. Conversation scripts may be in the form of relational databases which associate consumer queries with agent (or chatbot) responses, and may further include associations with context such as the goals, needs, and intents of a consumer, which may be used with the outputs of the conversation context manager 420 to provide appropriate responses to consumer queries.

Figure 5:
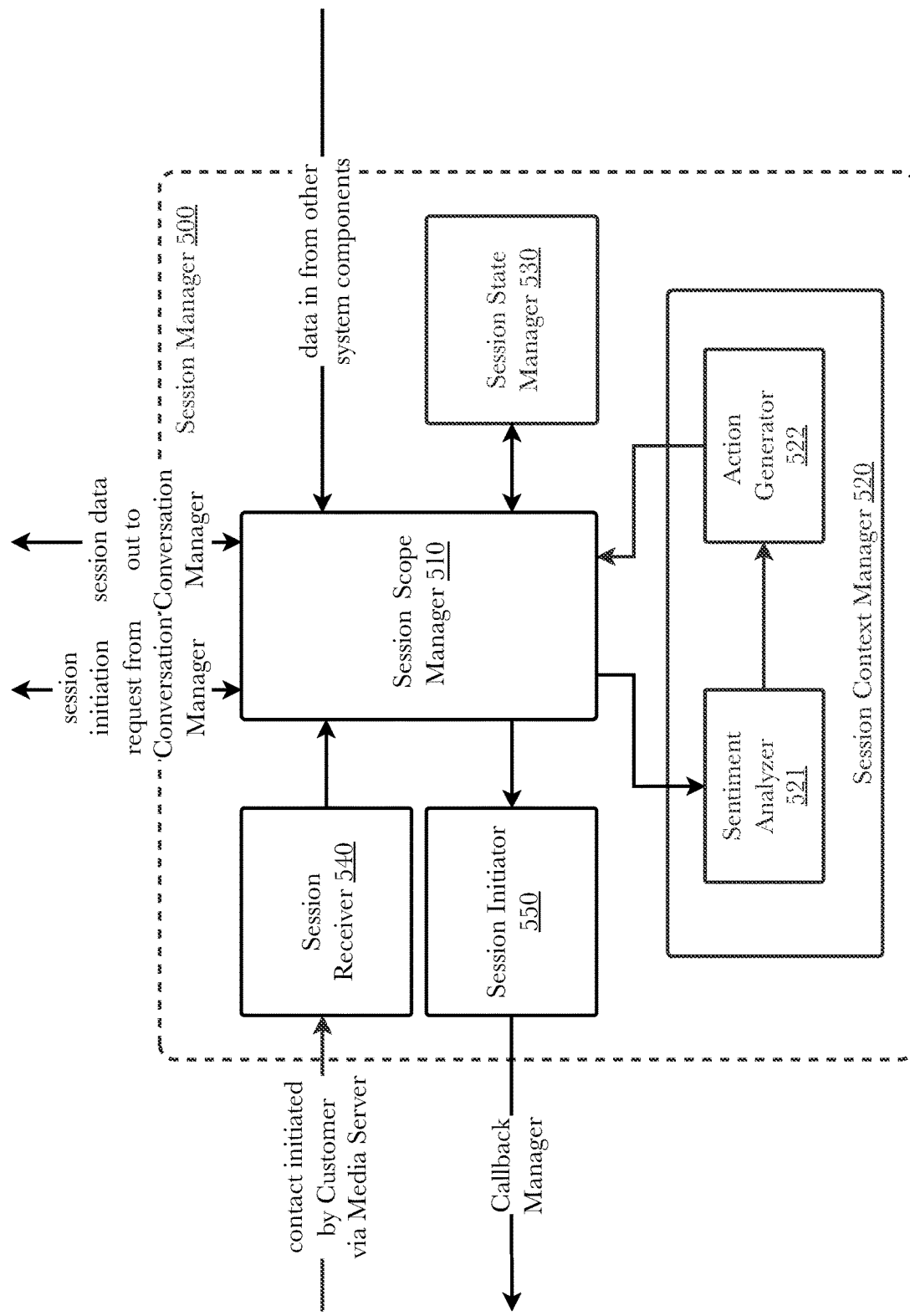
FIG. 5 is a block diagram illustrating an exemplary system architecture for a session manager aspect of an adaptive cloud conversation platform.

FIG. 5 is a block diagram illustrating an exemplary system architecture for a session manager aspect of an adaptive cloud conversation platform. The session manager is responsible for handling of communication sessions including assigning of session identifiers, instructing media server 700 to establish connections, and handling all incoming, outgoing, and stored data associated with each session. In this embodiment, session manager 500 comprises a session scope manager 510, a session context manager 520, a session state manager 530, a session receiver 540, and a session initiator 550.

Session scope manager 510 is responsible for implementing the session within its defined scope as determined by conversation scope manager 510. In the case where conversation manager 400 directs session scope manager 510 to initiate communications with a consumer, the directions from conversation manager 400 will contain the session scope. In the event that contact is initiated by a consumer, session scope manager 510 will send session data to conversation manager 400 for determination of the session scope. For example, the session scope may be a phone call between a buyer and a buyer's agent in the context of a larger conversation about a real estate transaction.

The session context manager 520 is responsible for analyzing the context of conversations and, in particular, for determining the sentiment of a consumer during the session using text of the session provided by the media server 700. The session context manager 520 incorporates a trained machine learning algorithm which receives session related data and determines a sentiment of the consumer using a sentiment analyzer 521 and recommends a corresponding action using an action generator 522. The training and operation of the machine learning algorithm is described later herein. The output of the session context manager 520 may be fed to other components for actions to be taken (e.g., a recommendation to escalate a conversation by switching modes from chat to a voice-based phone call) or may be fed to the machine learning algorithms of other components for further analysis (e.g., a determination that a consumer is satisfied with the current line of discussions with the current call, and may be receptive to additional offers, which action may be sent to the environment manager 1000 for consideration of follow up offers). In this way, the outputs of the machine learning algorithm(s) of each component of the platform may be acted on separately, or may be used as part of a network of machine learning algorithms, or some combination of the two.

The session state manager 530 stores state information such as the current session scope, whether the session is ongoing or completed, what type of connection(s) are being used at the consumer endpoints 140 and brand endpoints 150, the contact information used to establish the connection(s), etc. When a session is completed, the data stored in the session state manager 530 is sent to the conversation manager 400 for storage within the overall conversation (e.g., updates to the consumer profile, the brand CRM information, etc.).

The session receiver 540 receives communications initiated by the consumer and initiates a session by notifying the session scope manager 510. For example, if a consumer makes a phone call to a brand, the session receiver receives data about the phone call (e.g., customer's phone number) from the media server, and notifies the session scope manager 510 which coordinates with the session scope with the conversation manager 400.

The session initiator 550 receives directions from the session scope manager 510 to initiate a session, and directs the media server 700 to make the appropriate communication connections.

Figure 6:
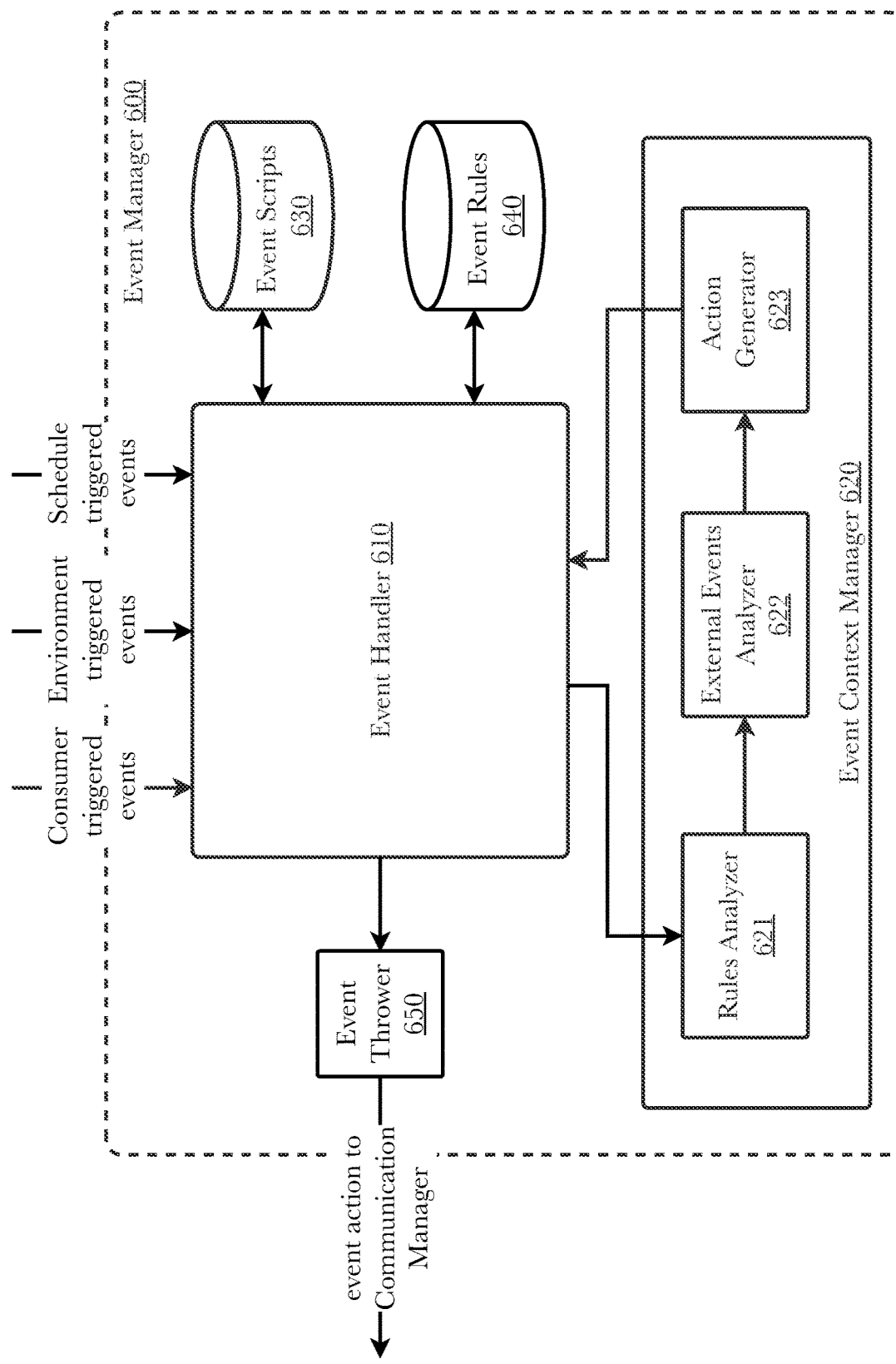
FIG. 6 is a block diagram illustrating an exemplary system architecture for an event manager aspect of an adaptive cloud conversation platform.

FIG. 6 is a block diagram illustrating an exemplary system architecture for an event manager aspect of an adaptive cloud conversation platform. The event manager 600 initiates callbacks based on events occurring outside of a session based on established event rules (e.g., callbacks on a consumer's birthday; promotional events established by a brand) or external events (e.g., a consumer's purchase of a product from a brand; weather events in the consumer's area that might suggest purchase of a product such as snow tires prior to a snow storm). Callbacks initiated by the event manager 600 are passed up to the connection management service layer 110 and executed by the callback manager 111. In this embodiment, the event manager 600 comprises an event handler 610, an event context manager 620, an event script database 630, an event rules database 640, and an event thrower 650.

The event handler 610 is responsible for triggering communication sessions based on events outside of a current session based on established event rules or external events. It does so by monitoring event notifications received from other components in the system, from outside sources (e.g., news websites, weather websites, etc.), or from schedules to determine whether any of the event notifications trigger a rule stored in the event rules database 640. Such rules may be simple (e.g., contact a consumer on his/her birthday) or complex (e.g., offer snow tires to customers living in a certain geographical area during the winter season when weather reports indicate snow in that geographical area within the next week). When a rule is triggered by an event notification, a corresponding event script is retrieved from an event script database 630, the event script providing instructions for handling of the event (e.g., send out a broadcast email to all affected consumers), which instructions are sent to an event thrower 650 which implements the script by throwing an event with an event action to the communication manager 400.

The event context manager 620 analyzes established rules and external events to identify additional relationships between the rules, external events, and consumers. The event context manager 620 incorporates a trained machine learning algorithm which receives conversation related data and identifies additional relationships (possibly unknown or hidden) using a rules analyzer 621 and an external events analyzer 622, and recommends a corresponding action using an action generator 322. The training and operation of the machine learning algorithm is described later herein. The output of the event context manager 620 may be fed to other components for actions to be taken (e.g., a recommendation offer other winter-related products to certain consumers in addition to snow tires) or may be fed to the machine learning algorithms of other components for further analysis (e.g., forwarding of the identified additional relationships to the environment manager 1000 for analysis). In this way, the outputs of the machine learning algorithm(s) of each component of the platform may be acted on separately, or may be used as part of a network of machine learning algorithms, or some combination of the two.

Figure 7:
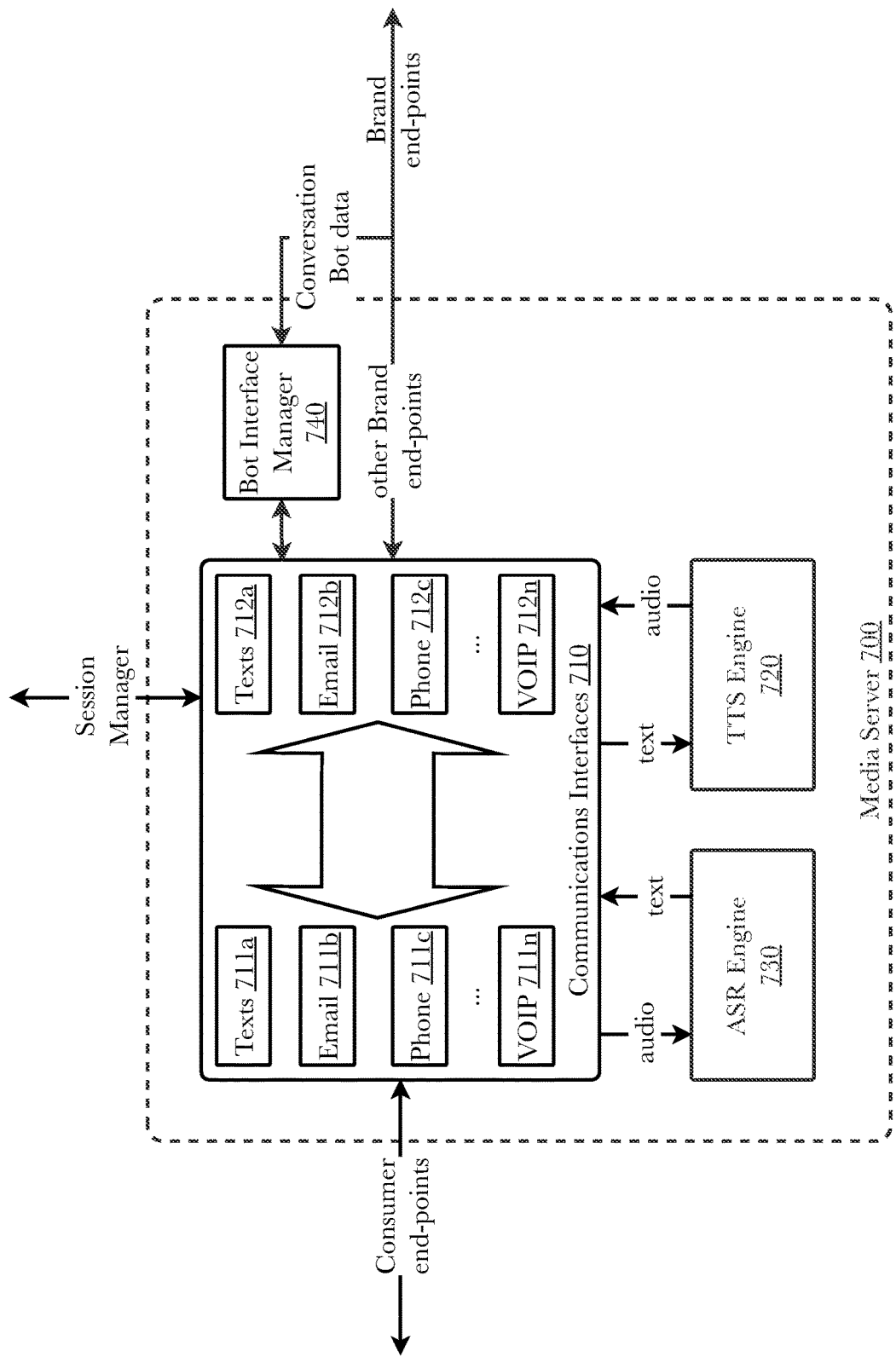
FIG. 7 is a block diagram illustrating an exemplary system architecture for a media server aspect of an adaptive cloud conversation platform.

FIG. 7 is a block diagram illustrating an exemplary system architecture for a media server aspect of an adaptive cloud conversation platform. The media server 700 establishes communications between consumer endpoints 140 and brand endpoints 150 and performs any necessary media translations (e.g., automated speech recognition, text to speech, etc.). In this embodiment, the media server 700 comprises communications interfaces 710, a text-to-speech engine 720, an automated speech recognition engine 730, and a bot interface manager 740.

The communications interfaces 710 comprise communications channels on both the consumer side 711a-n and the brand endpoint side 712a-n, including, but not limited to text channels 711a, 711b for chat windows and short message service (SMS) messages, email channels 711b, 712b for sending and receipt of communications via email, phone channels 711c, 712c for communications via plain old telephone service (POTS) lines, and voice-over-Internet-protocol (VOIP) channels 711n, 712n for voice communications over the Internet. Note that the communications interfaces 710 may also contain hardware and software for conversion of one type of channel on one end to a different type of channel on the other end. For example, the audio of a call from a consumer who calls using a POTS phone channel 711c may be converted to a VOIP channel 712n on the brand end, and vice-versa, so as to facilitate communications between different channels on either end. In some cases, text-based channels 711a-b, 712a-b may be converted to audio channels 711c-n, 712c-n and vice-versa by using the automated speech recognition (ASR) engine 730 to convert spoken audio to text and by using the text-to-speech (TTS) engine 720 to convert text to spoken audio.

The text-to-speech engine 720 may further be used to convert spoken audio to text for analysis by other components such as the session manager 500 or the conversation manager 400. This may be done in near-real-time or may be done with a delay such as by recording the audio and converting the recorded audio at a later time.

The bot interface manager 740 is used to relay communications from the brand-side communications interfaces 712a, b to an appropriate conversation bot (e.g., a text-based chatbot or to an appropriate audio-based interactive voice response (IVR) system or virtual assistant such as Siri, Alexa, or similar). Where the conversation bot is a third party conversation bot such as Siri or Alexa, the bot interface manager 740 also forwards the consumer-bot communications the brand for integration into its CRM database and other systems, or for handling by an agent at a brand endpoint 150 if the call is later transferred to such agent.

Figure 8:
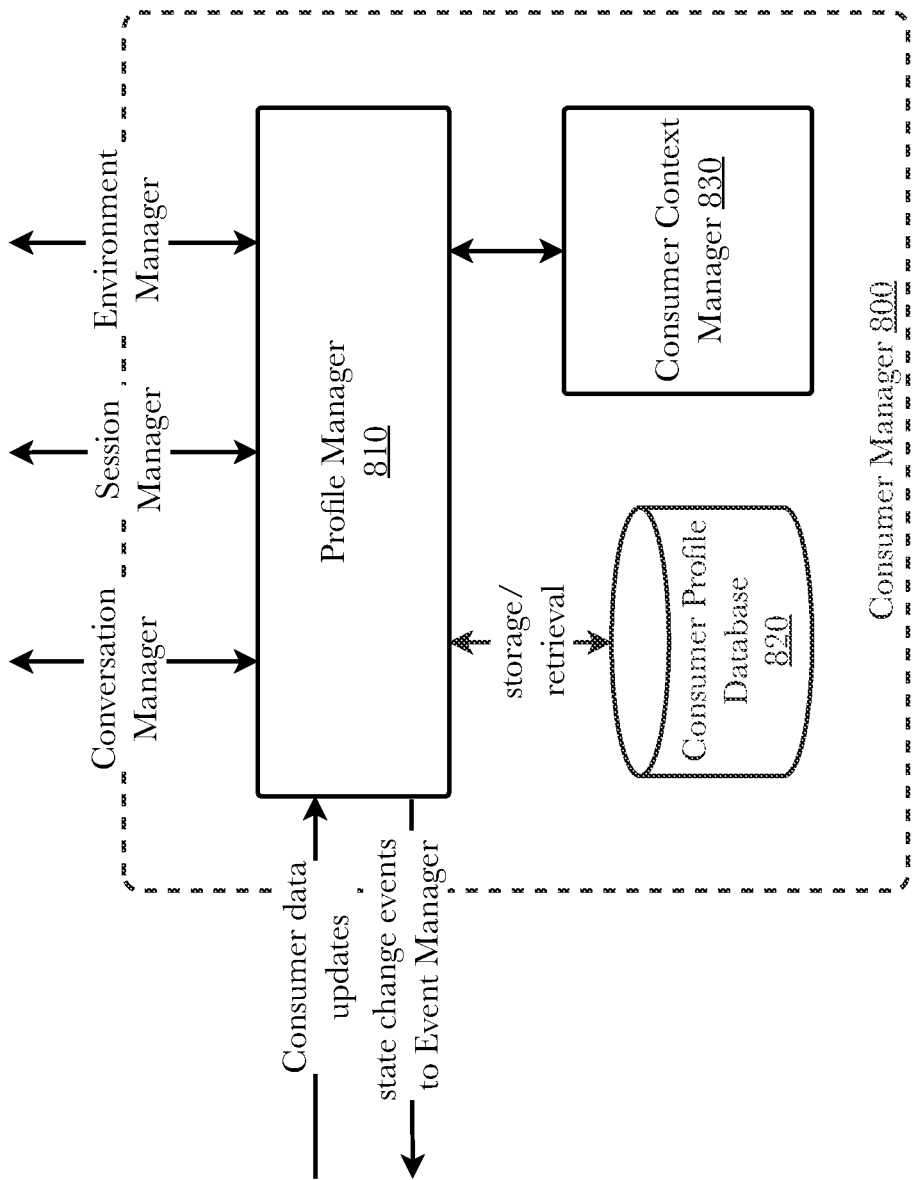
FIG. 8 is a block diagram illustrating an exemplary system architecture for a consumer manager aspect of an adaptive cloud conversation platform.

FIG. 8 is a block diagram illustrating an exemplary system architecture for a consumer manager aspect of an adaptive cloud conversation platform. The consumer manager 800 manages the profiles of consumers for use in establishing effective conversations with them, and engages in proactive conversation analysis to determine whether a proactive communication with a consumer should be initiated. In this embodiment, the consumer manager 800 comprises a profile manager 810, a consumer profile database 820, and a consumer context manager 830.

The profile manager 810 handles all consumer data updates received either from the consumer or from other components of the system, and stores and retrieves information from consumer profiles in the consumer profile database 820 and forwards this information to other platform components, as needed. Consumer profiles may contain any information relevant to a consumer, his or her relationships with one or more brands, and any conversations in which the consumer has taken part. This includes, but is not limited to, the name, address, phone number, and other identifying information of the consumer; brands with whom the consumer has interacted and histories of such interactions, including product/service inquiries, product/service purchases and returns, and product/service reviews and comments; and logs and recordings of conversations, analyses of such conversations to determine wants, needs, intents, and goals, and lists of other consumers with whom the consumer has had conversations and their relationships. In some embodiments, each consumer will have a single, unique profile for all conversations and all brands. In other embodiments, more than one profile may be established for a given consumer, depending on the configuration (e.g., a profile may be established for each brand with whom the consumer has had one or more conversations). The profile manager 810 notifies the event manager 810 of changes to the state of the profile (e.g., a change in a consumer's address) that may impact event rules.

The consumer context manager 830 learns about the consumer's behaviors and preferences in relation to events and brand attributes that are associated with consumer behaviors. Consumer behaviors and preferences include, but are not limited to, types and amounts of products and services purchased, dates and times of purchases, types and amounts of entertainment media consumed (e.g., computer games, television crime series, documentaries), interests indicated by certain purchases (e.g., purchases of season tickets to a baseball stadium indicate an interest in sports, especially baseball). Consumer behaviors and preferences may be implied (e.g., the purchase of baseball tickets implies an interest in baseball) or expressed (e.g., "I like watching baseball."). The customer behaviors and preferences are likely to be associated with certain events and/or brand attributes. The consumer context manager 830 incorporates a trained machine learning algorithm which recommends conversations with consumers based on predicted associations between consumer behaviors and preferences and events and/or brand attributes. The training and operation of the machine learning algorithm is described later herein. Inputs to consumer context manager 830 may comprise text of a conversation with a consumer, events comprising actions taken by the consumer (e.g., completing a purchase, calling customer service, etc.), or past behaviors of the consumer stored in consumer profile database. Outputs of consumer context manager 830 may comprise recommended actions to be taken in response to the inputs, such as scheduling a callback. The output of the consumer context manager 830 may be fed to other components for actions to be taken (e.g., scheduling of a sales call based on an upcoming event to which the consumer may be responsive) or may be fed to the machine learning algorithms of other components for further analysis (e.g., to the conversation manager to determine the best mode of starting the a conversation based on the upcoming event). In this way, the outputs of the machine learning algorithm(s) of each component of the platform may be acted on separately, or may be used as part of a network of machine learning algorithms, or some combination of the two.

Figure 9:
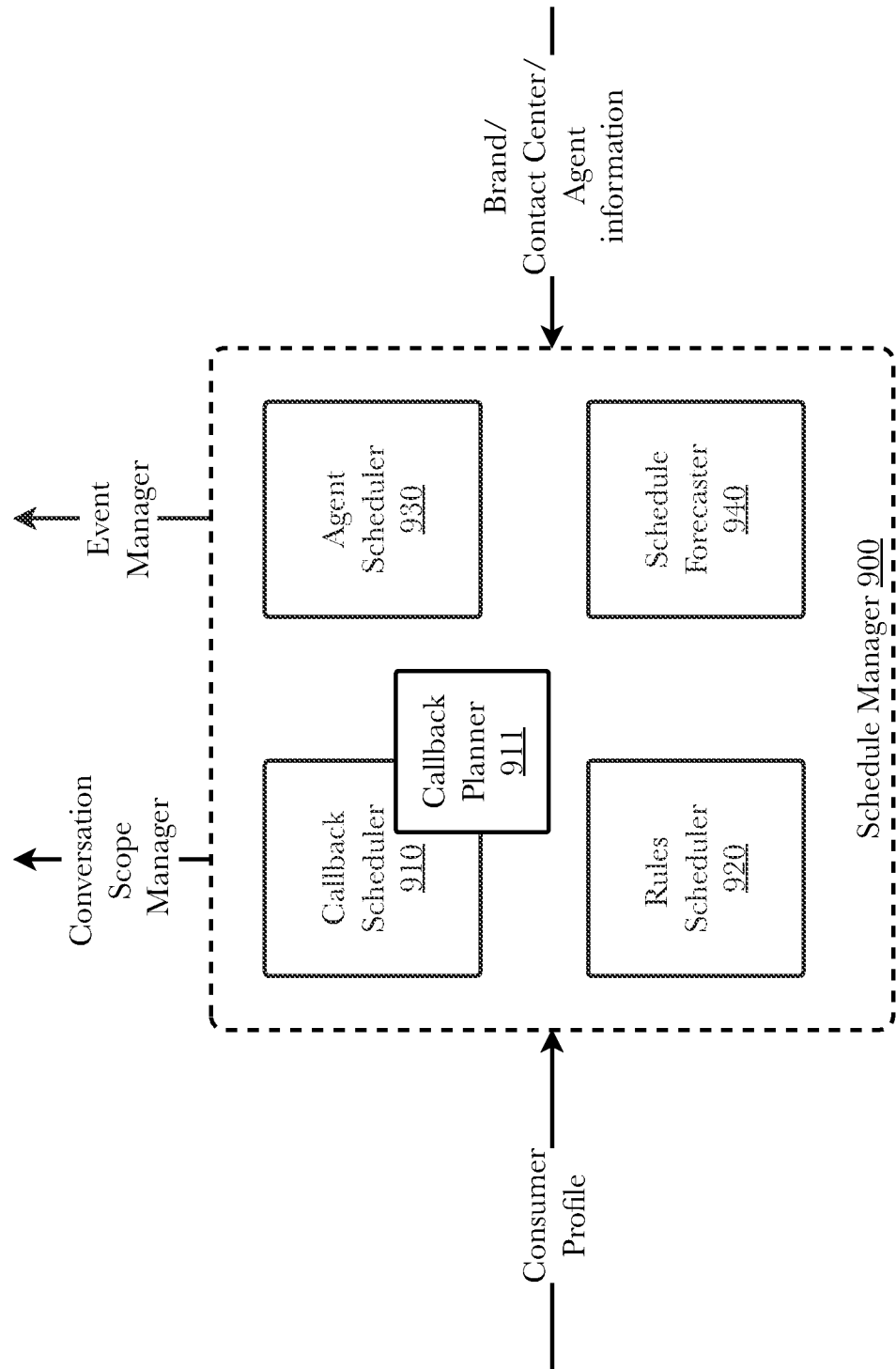
FIG. 9 is a block diagram illustrating an exemplary system architecture for a schedule manager aspect of an adaptive cloud conversation platform.

FIG. 9 is a block diagram illustrating an exemplary system architecture for a schedule manager aspect of an adaptive cloud conversation platform. The schedule manager 900 determines when communications should be established and schedules callbacks based on the determinations. In this embodiment, the schedule manager 900 comprises a callback scheduler 910, a callback planner 911, a rules scheduler 920, an agent scheduler 930, and a schedule forecaster.

The callback scheduler 910 receives requests to schedule callbacks from other platform components and determines when the callback should be made based on consumer preferences and availability from the consumer profile, rules for scheduling callbacks set forth in the rules scheduler 920, agent availabilities set forth in an agent scheduler 930, and forecasts made by the schedule forecaster 940 of when the consumer and agent will be mutually available if and when certain rules are active. The determination of when the callback should be made is performed by the callback planner 911. The callback planner 911 is responsible for analyzing the data set forth above and determining when to schedule the call. The callback planner 911 incorporates a trained machine learning algorithm which receives the above data and predicts one or more preferred callback times, which are then placed into the schedule by the callback scheduler 910. The training and operation of the machine learning algorithm is described later herein. The output of the callback planner 911 may be fed to other components for actions to be taken (e.g., a change in event rules of the event manager 600) or may be fed to the machine learning algorithms of other components for further analysis although, in this embodiment, the callback scheduler is the final destination of the determinations of all other machine learning algorithms. In this way, the outputs of the machine learning algorithm(s) of each component of the platform may be acted on separately, or may be used as part of a network of machine learning algorithms, or some combination of the two.

Figure 10:
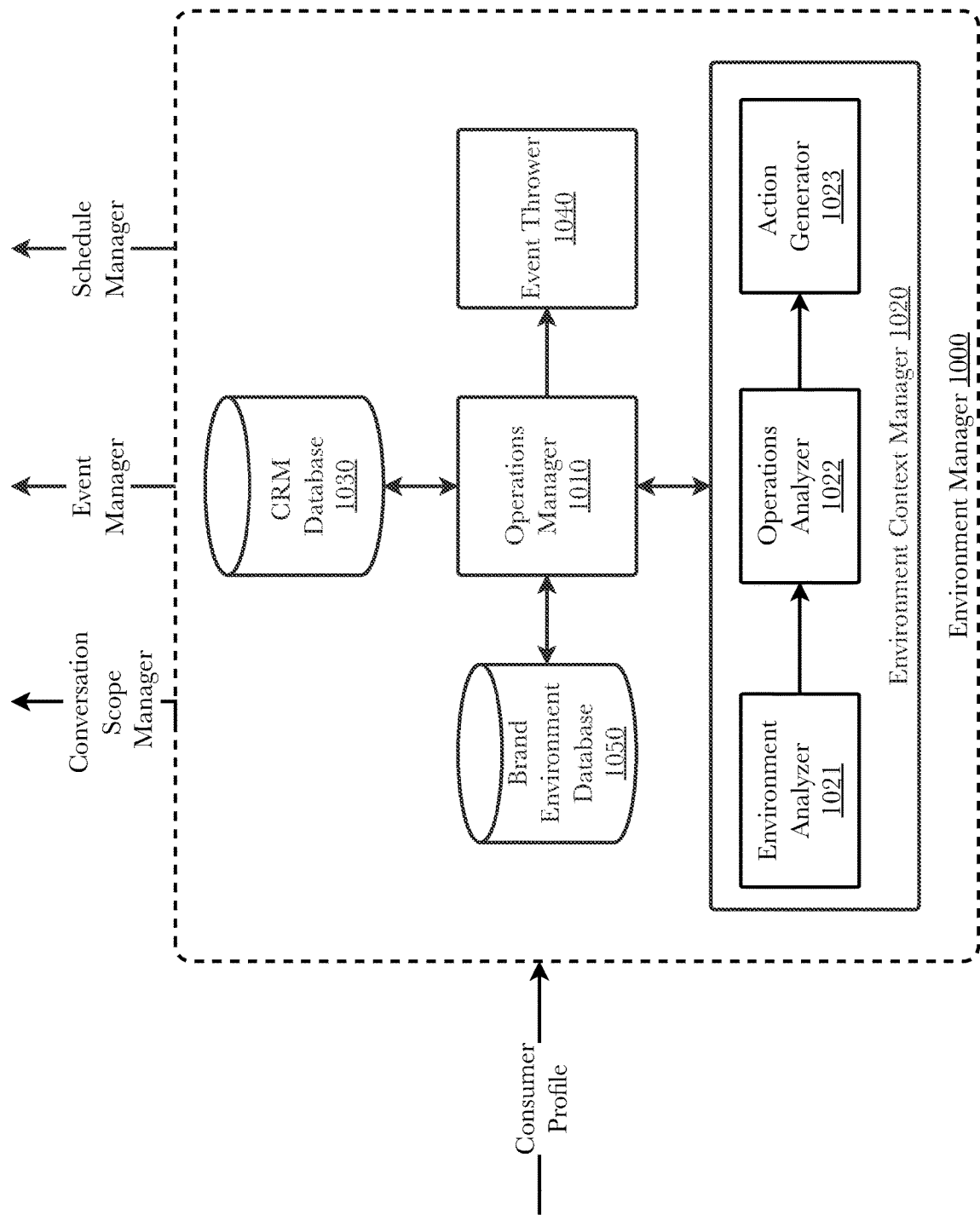
FIG. 10 is a block diagram illustrating an exemplary system architecture for an environment manager aspect of an adaptive cloud conversation platform.

FIG. 10 is a block diagram illustrating an exemplary system architecture for an environment manager aspect of an adaptive cloud conversation platform. The environment manager 1000 stores information about brands including operations information and analysis, locations and status of communications infrastructure, and customer relationship management (CRM) information, which can be used to trigger scheduling of callbacks by sending instructions up to the initiation management services layer 120 for event rule establishment by the event manager 600 or scheduling by the schedule manager 900. In this embodiment, the environment manager 1000 comprises an operations manager 1010, an environment context manager 1020, a customer relationship management (CRM) database 1030, an event thrower 1040, and a brand environment database 1050.

The operations manager 1010 contains an interface through which brands can enter or upload their brand environment data and customer relationship management (CRM) data. The brand environment data is information about the brand useful for management of conversations with consumers and may include, but is not limited to, infrastructure data (e.g., sales locations; contact center locations, capacities, and capabilities, etc.), operational data (e.g., current and scheduled call volumes, etc.), product/service information, fitness parameters (e.g., average 90% retention rate for consumers), all of which is stored in the brand environment database 1050. The CRM data is information about the consumers and their contacts with the brand and includes, but is not limited to, consumer identifications and contact information, histories of interactions with the brand, and products and services purchased, all of which is stored in the CRM database 1030. Note that the information stored in the CRM database 1030 may be exported to and duplicated in the consumer profile database 820.

The environment context manager 1020 is responsible for analyzing the information contained in the brand environment database 1050 and CRM database 1030 to determine whether a campaign of communications should be established with a plurality of consumers. The environment context manager 1020 incorporates a trained machine learning algorithm which analyzes the information brand environment database 1050 and CRM database 1030 using an environment analyzer 1021, further determines whether there are appropriate operational resources (e.g., agents with appropriate skills, sufficient contact center capacity given current or predicted call volumes, etc.) using an operations analyzer 1022, and recommends a corresponding action using an action generator 1023. The training and operation of the machine learning algorithm is described later herein. The output of the environment context manager 1020 may be fed to other components for actions to be taken (e.g., a recommendation to schedule a callbacks by phone with a plurality of consumers may be sent to the schedule manager to schedule the callbacks) or may be fed to the machine learning algorithms of other components for further analysis (e.g., a request to determine a best mode of communication may be sent to the conversation manager for analysis). In this way, the outputs of the machine learning algorithm(s) of each component of the platform may be acted on separately, or may be used as part of a network of machine learning algorithms, or some combination of the two.

The event thrower 1040 throws events to other platform components with instructions to schedule or establish communications with a consumer either associated with an existing conversation or a new conversation.

Figure 11:
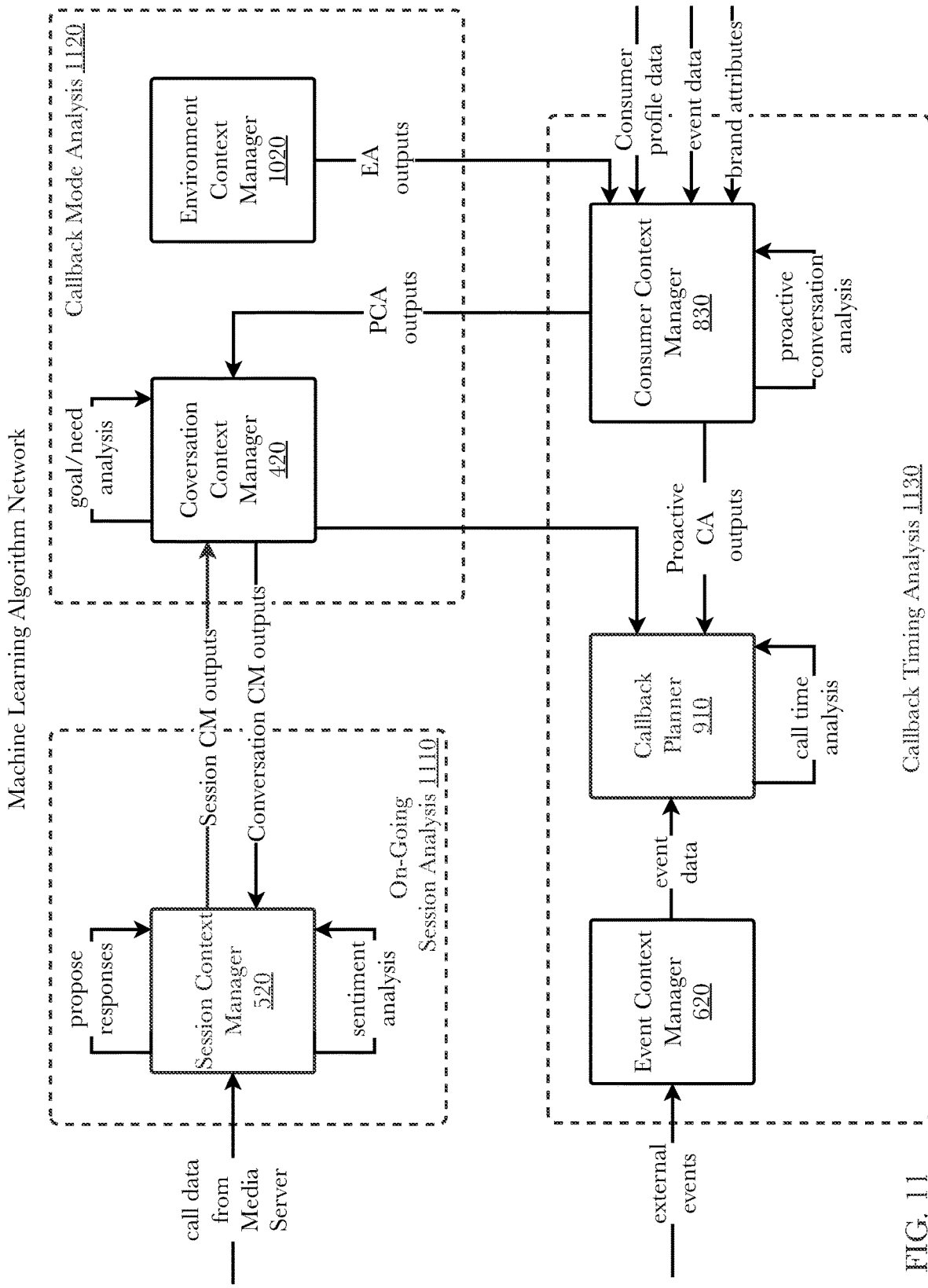
FIG. 11 is a block diagram illustrating an exemplary system architecture for a machine learning algorithm network aspect of an adaptive cloud conversation platform.

FIG. 11 is a block diagram illustrating an exemplary system architecture for a machine learning algorithm network aspect of an adaptive cloud conversation platform. This diagram shows the machine learning algorithm (MLA) of each platform component and an exemplary configuration of such MLAs into a network of MLAs for complex decision-making related to conversations. In this embodiment, the MLA network comprises the session context manager 520, the conversation context manager 420, the environment analyzer 1050, the event context manager 620, the callback planner 911, and the consumer context manager, arranged in a network such that the outputs of certain MLAs can be used as inputs to other MLAs to make more complex or refined decisions than are possible using a single MLA. The components of the MLA network are arranged conceptually into three overall types of analysis. Ongoing session analyses 1110 (i.e., what is happening in the current communication) are performed by the session context manager 520. Callback mode analyses 1120 (i.e., how a call should be made, what channels, etc.) are performed by the conversation context manager 420 and/or the environment analyzer 1050. Callback timing analyses 1130 (e.g, when a call should be made) are performed by the event context manager 620, the callback planner 911, and the consumer context manager 830.

In this embodiment, the session context manager 520 receives real-time or near-real-time text data from the media server for any ongoing calls, processes the data through one or more machine learning algorithms to perform sentiment analysis and then propose responses to the consumer based on the sentiment analysis. In some embodiments, the proposed responses may be generated from unsupervised machine learning algorithms or reinforcement machine learning algorithms rather than supervised (i.e., pre-trained) machine learning algorithms. An unsupervised machine learning algorithm learns from the data itself by association, clustering, or dimensionality reduction, rather than having been pre-trained to discriminate between labeled input data. Reinforcement learning algorithms learn from repeated iterations of outcomes based on probabilities with successful outcomes being rewarded. These types of machine learning algorithms are ideal for exploring large number of possible outcomes such as possible outcomes from different approaches to a conversation, and so would be suitable for proposing responses to consumer queries.

In this embodiment, the sentiment analysis and proposed responses may be provided to the conversation context manager 420 for performance of a goals, needs, and intents analysis. For example, the session context manager 520 determines that the consumer's sentiment on the call is negative, the text data and the indication of negative sentiment may be analyzed by the conversation context manager 420 which may determine that the consumer actually wants to buy a replacement product rather than fix the existing one. This intent analysis can then be sent back to the session manager for proposal of a appropriate responses. Alternately, the intent analysis can be sent to the callback planner 911 for scheduling of a callback from a salesperson who can sell the replacement product instead of the current agent trying to fix the product.

In this embodiment, the environment context manager 1020 may likewise determine whether and how to establish a conversation with a consumer by analyzing the information contained in the brand environment database 1020 and CRM database 1030 to determine whether a communication should be scheduled or established with a consumer based on data within the brand's environment. The outputs of the environment context manager 1020 may be sent to a consumer context manager 830 for determination as to whether a proactive conversation should be started based on the combination of environment context manager 1020 outputs and the information in the consumer profile database such as conversation histories. If a conversation is recommended either by the environment context manager 1020 or the consumer context manager 830, the recommendation is sent either to the conversation context manager 420 for determination of a best mode of communication or, if the mode is known or not of particular importance, to the callback planner 911 for determination of a best communication time.

In this embodiment, the consumer context manager 830 performs proactive conversation analysis based on consumer behaviors, consumer preferences, events associated with consumer behaviors and/or preferences, and brand attributes associated with consumer behaviors and/or preferences to determine whether a proactive conversation should be initiated with a consumer. The outputs of the consumer context manager 830 may be sent to the callback planner 910 for scheduling, or to the conversation context manager 420 for determination of a best mode of for initiating a proactive conversation.

Finally, in this embodiment, the event context manager's 620 machine learning algorithms may determine that a communication should be established based on a rule, external event, or analysis of rules or external events combined with information stored in the consumer profile database. In such a case, the outputs of the event context manager 620 are sent to the callback planner 911 for determination of a best communication time.

Detailed Description of Exemplary Aspects

Figure 12:
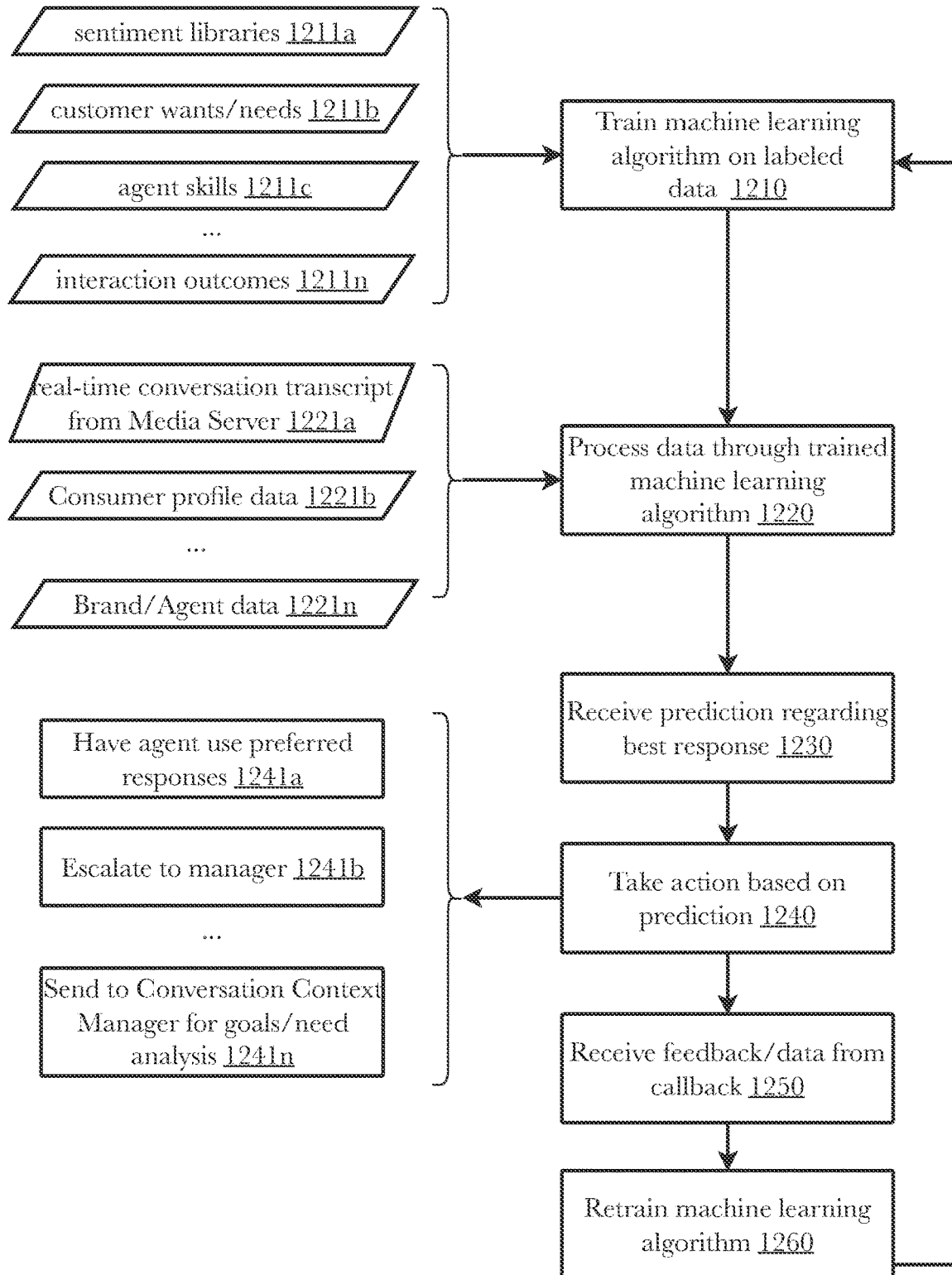
FIG. 12 is a flow diagram illustrating an exemplary method for training and operation of machine learning algorithms for ongoing session analysis.

FIG. 12 is a flow diagram illustrating an exemplary method for training and operation of machine learning algorithms for ongoing session analysis. In this example, it is assumed that a supervised machine learning algorithm (MLA) is being used, but in other embodiments, unsupervised machine learning algorithms or reinforcement machine learning algorithms may be used if better suited to the analyses being performed. Here, the machine learning algorithm is trained 1210 on labeled data such as sentiment libraries 1211a, indications of customer wants/needs in relation to certain words and phrases 1211b, agent skills 1211c, and interaction outcomes based on the above 1211n. Once the MLA has been trained, actual data is processed 1220 through the trained machine learning algorithm in the form of a statement from a real-time conversation transcript from the media server 1221a, consumer profile data 1221b, and brand/agent data 1221n. The MLA outputs a prediction regarding the best response 1230 to the consumer's statement, and an action is taken based on the prediction 1240 such as having the agent use the preferred response 1241a, escalating the call to a manager 1241b, or sending the data to the conversation context manager for a goals, needs, and intents analysis 1241n to better determine a response. As feedback data is received from the callback 1250, it may be used to retrain the machine learning algorithm 1260. Over time, the MLA will adapt its outputs to the retraining based on real-world data to provide more accurate predictions.

Figure 13:
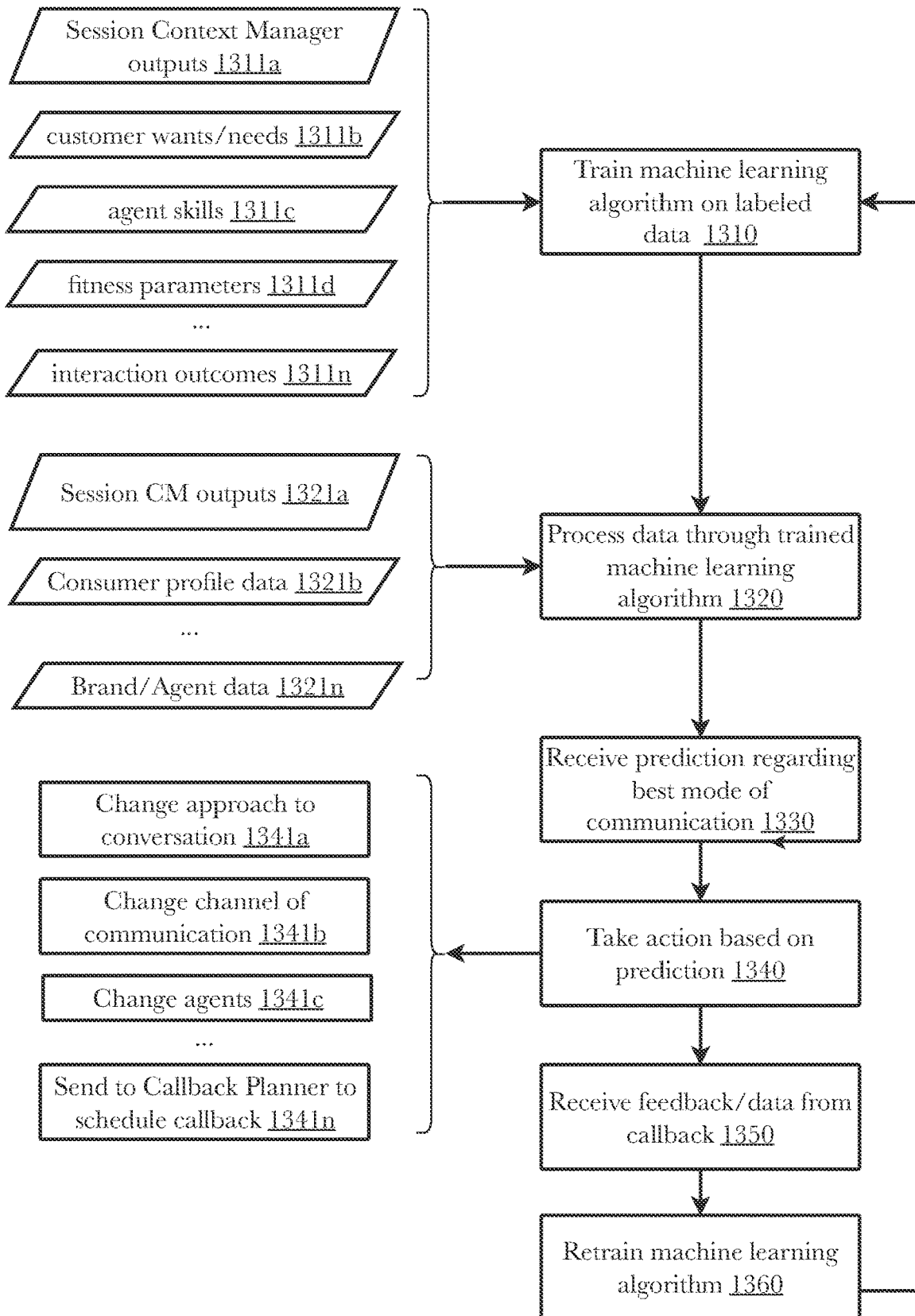
FIG. 13 is a flow diagram illustrating an exemplary method for training and operation of machine learning algorithms for callback mode analysis.

FIG. 13 is a flow diagram illustrating an exemplary method for training and operation of machine learning algorithms for callback mode analysis. In this example, it is assumed that a supervised machine learning algorithm (MLA) is being used, but in other embodiments, unsupervised machine learning algorithms or reinforcement machine learning algorithms may be used if better suited to the analyses being performed. Here, the machine learning algorithm is trained 1310 on labeled data such as session context manager outputs 1311a, indications of customer wants/needs in relation to certain words and phrases 1311b, agent skills 1311c, fitness parameters established by the brand 1311d, and interaction outcomes based on the above 1311n. Once the MLA has been trained, actual data is processed 1320 through the trained machine learning algorithm in the form of session context manager outputs 1321a, consumer profile data 1321b, and brand/agent data 1321n. The MLA outputs a prediction regarding the best mode of communication 1330 with the consumer, and an action is taken based on the prediction 1340 such as changing the approach to the conversation 1341a, changing the channel of communication 1341b, changing agents 1341c, or sending the data to the callback planner to schedule a callback 1341n to better determine a response. As feedback data is received from the callback 1350, it may be used to retrain the machine learning algorithm 1360. Over time, the MLA will adapt its outputs to the retraining based on real-world data to provide more accurate predictions.

Figure 14:
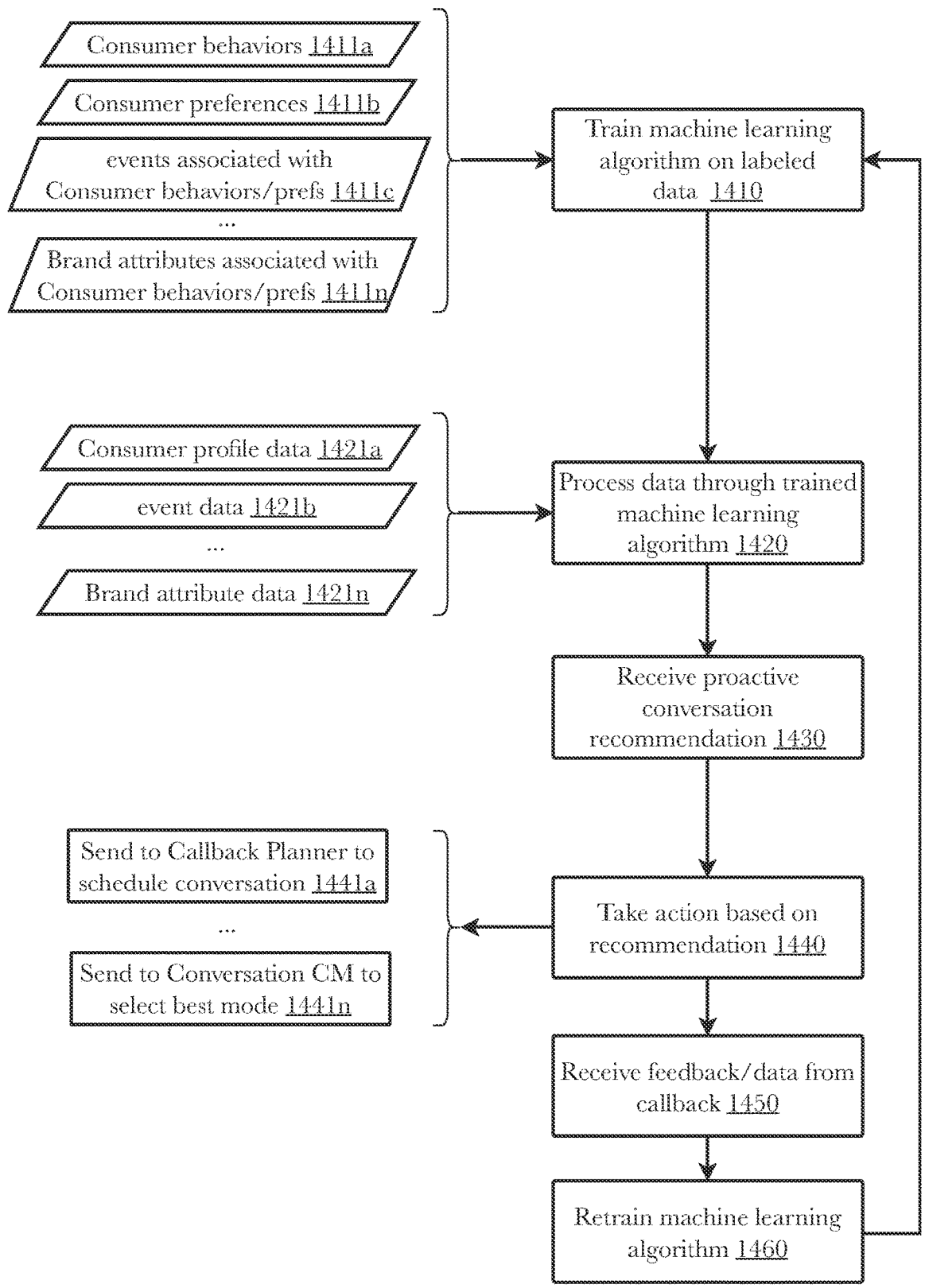
FIG. 14 is a flow diagram illustrating an exemplary method for training and operation of machine learning algorithms for proactive conversation analysis.

FIG. 14 is a flow diagram illustrating an exemplary method for training and operation of machine learning algorithms for proactive conversation analysis. In this example, it is assumed that a supervised machine learning algorithm (MLA) is being used, but in other embodiments, unsupervised machine learning algorithms or reinforcement machine learning algorithms may be used if better suited to the analyses being performed. Here, the machine learning algorithm is trained 1410 on labeled data such as consumer behaviors 1411a, consumer preferences 1411b, events associated with consumer behaviors and/or preferences 1411c, and brand attributes associated with consumer behaviors and/or preferences 1411n. Once the MLA has been trained, actual data is processed 1420 through the trained machine learning algorithm in the form of consumer profile data 1421a, and event data 1421b, and brand attribute data 1421n. The MLA outputs a recommendation regarding a proactive conversation 1430 with the consumer, and an action is taken based on the prediction 1440 such as sending the data to the callback planner to schedule a conversation 1441a or sending the data to the conversation context manager 1441n to select a best mode for initiating a conversation. As feedback data is received from the callback 1450, it may be used to retrain the machine learning algorithm 1460. Over time, the MLA will adapt its outputs to the retraining based on real-world data to provide more accurate predictions.

Figure 15:
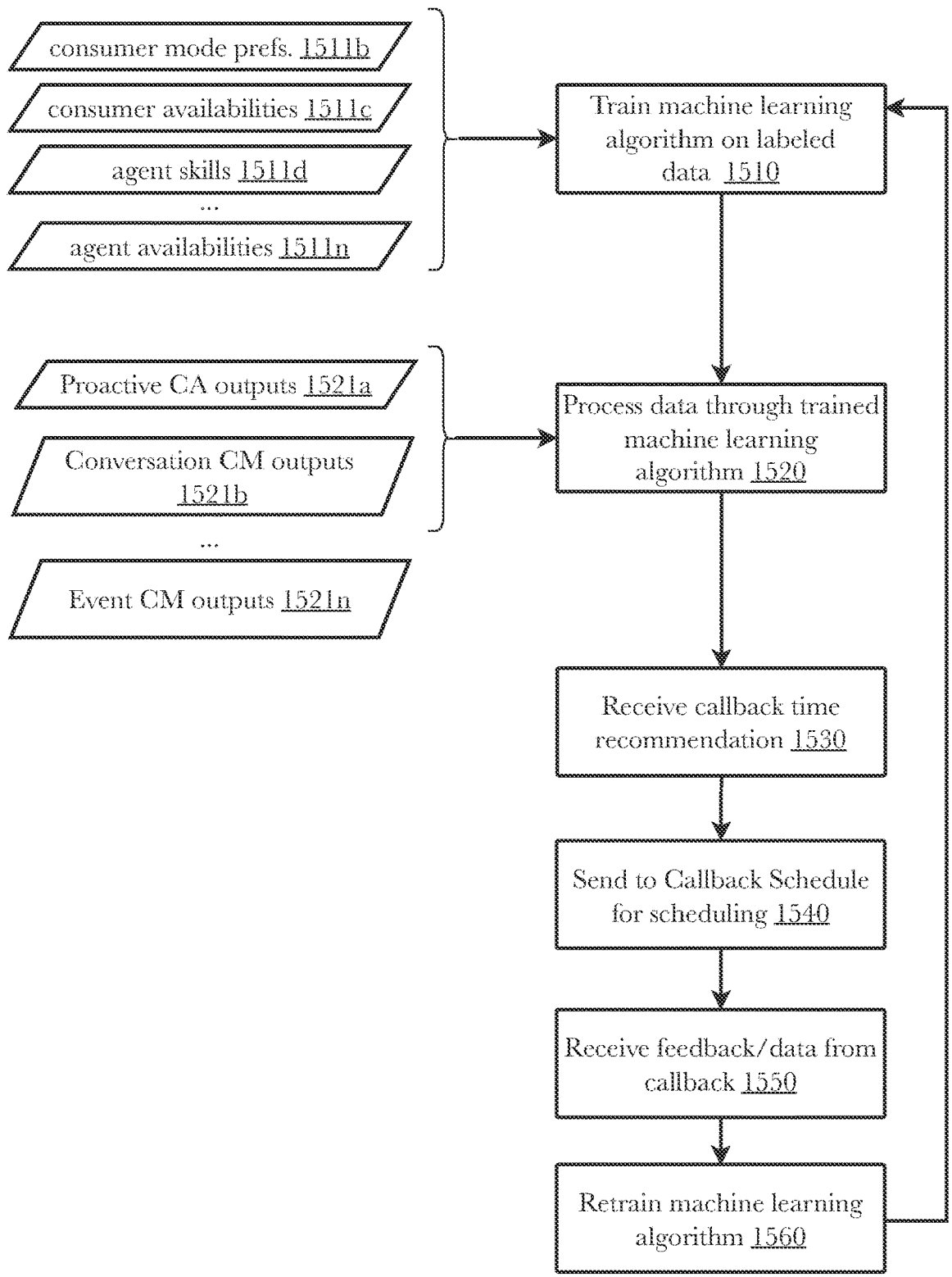
FIG. 15 is a flow diagram illustrating an exemplary method for training and operation of machine learning algorithms for callback planning.

FIG. 15 is a flow diagram illustrating an exemplary method for training and operation of machine learning algorithms for callback planning. In this example, it is assumed that a supervised machine learning algorithm (MLA) is being used, but in other embodiments, unsupervised machine learning algorithms or reinforcement machine learning algorithms may be used if better suited to the analyses being performed. Here, the machine learning algorithm is trained 1510 on labeled data such as consumer mode preferences 1511b, consumer availabilities 1511c, agent skills 1511d, and agent availabilities 1511n. Once the MLA has been trained, actual data is processed 1520 through the trained machine learning algorithm in the form of proactive conversation analysis outputs 1521a, conversation context manager outputs 1521b, and event context manager outputs 1521n. The MLA outputs a recommendation regarding a callback time 1530 with the consumer, and the recommendation is sent to the callback scheduler for scheduling 1540. As feedback data is received from the callback 1550, it may be used to retrain the machine learning algorithm 1560. Over time, the MLA will adapt its outputs to the retraining based on real-world data to provide more accurate predictions.

Figure 16:
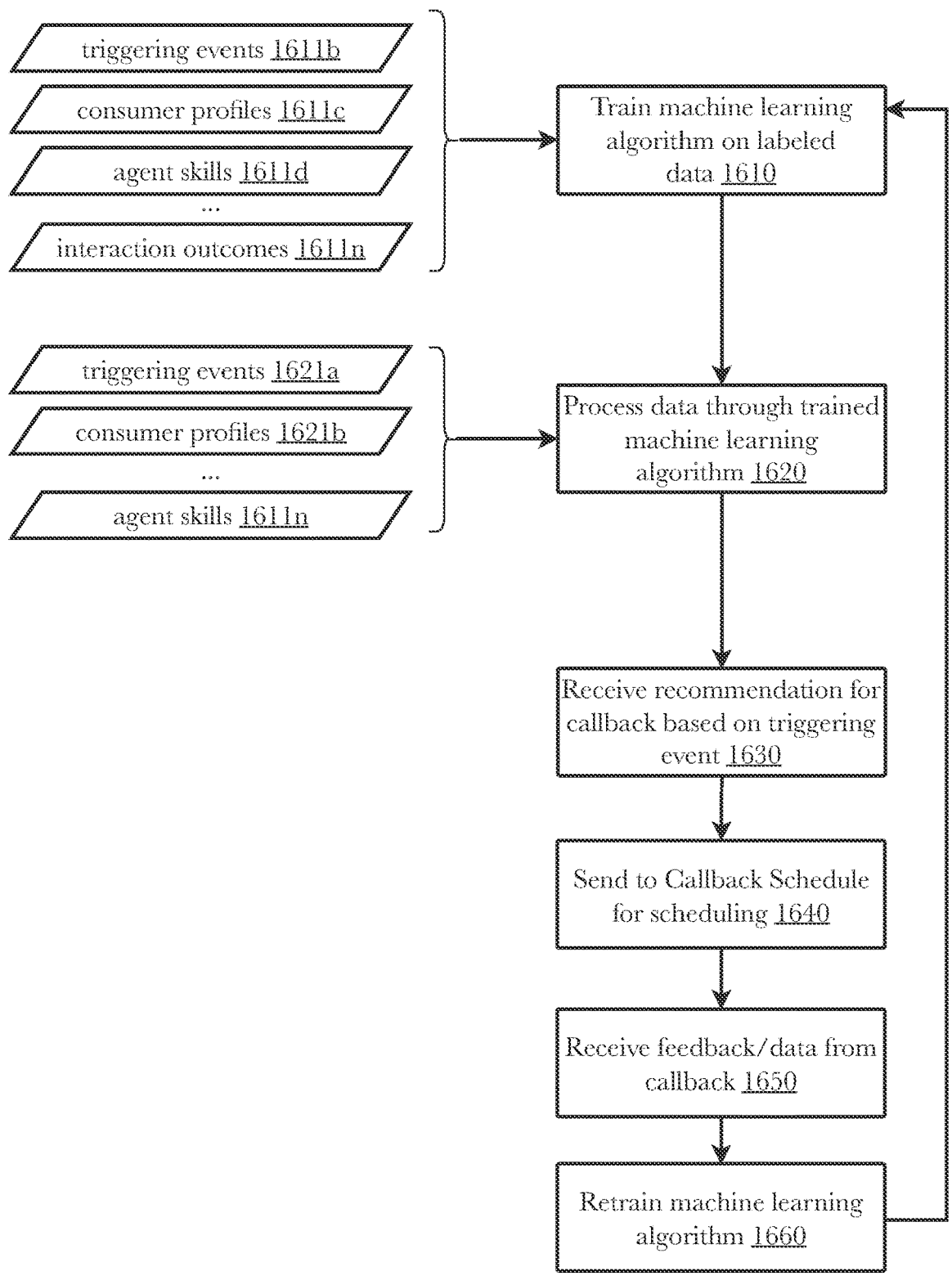
FIG. 16 is a flow diagram illustrating an exemplary method for training and operation of machine learning algorithms for event context analysis.

FIG. 16 is a flow diagram illustrating an exemplary method for training and operation of machine learning algorithms for event context analysis. In this example, it is assumed that a supervised machine learning algorithm (MLA) is being used, but in other embodiments, unsupervised machine learning algorithms or reinforcement machine learning algorithms may be used if better suited to the analyses being performed. Here, the machine learning algorithm is trained 1610 on labeled data such as triggering events 1611b, consumer profile information 1611c, agent skills 1611d, and interaction outcomes from the above 1611n. Once the MLA has been trained, actual data is processed 1620 through the trained machine learning algorithm such as triggering events 1621a from the event manager, consumer profile data 1621b, and available agent skills 1611n. The MLA outputs a recommendation for a callback based on the triggering event 1630, and the recommendation is sent to the callback scheduler to schedule a callback 1640. As feedback data is received from the callback 1650, it may be used to retrain the machine learning algorithm 1660. Over time, the MLA will adapt its outputs to the retraining based on real-world data to provide more accurate predictions.

FIG. 17 is a flow diagram illustrating an exemplary use case examples for a mindful cloud conversation platform. In a standard callback scenario 1710, a consumer may request a callback based on a failed or delayed contact with a brand 1711 (e.g., being put on hold prior to speaking with an agent), and a callback is made either by the first available agent or according to another rule 1712. In a proactive conversation scenario 1720, the consumer may interact with the brand in some way (e.g., by making a purchase) that is entered into the brand environment database. A determination is made that a callback is warranted or would be useful as some future time (e.g., survey on the following day, survey after delivery of the product purchased) 1721. In a media-switching callback scenario 1730, a consumer might be having an active chat session with a brand and the session context manager detects dissatisfaction with the call due to negative sentiment 1731. The chat session is escalated to a voice-based callback to mitigate the negative impact of the dissatisfying chat session 1732. In a consumer event-based callback scenario, a consumer takes some action which generates a callback event such as making an in-person purchase and consenting to a callback at a later time 1740; getting lost on the way to a store, wherein the navigation system detects the off-route driving and offers a callback 1741; communicating with a virtual assistant such as Siri or Alexa, wherein the forwarding of the interaction from the bot interface manager 740 leads to a callback 1742; or a consumer passes by a near field communication (NFC) beacon on a physical display at a store, and consents to a callback sent to the consumer's mobile device by the beacon 1743. In each of these circumstances, a callback is scheduled using the callback scheduler 1744. In a rule-based callback scenario, some pre-established rule triggers a callback such as when a desired product is in stock 1750, when a desired agent is available 1751, or when the consumer's position in a physical queue (e.g., at a restaurant that operates a queue notification system) has advanced to the front of the queue 1752. In each of these circumstances, a callback is schedules using the callback scheduler. The above-listed examples are not intended to be limiting, and many other such use cases may be handled by the platform.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit ("ASIC"), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 18:
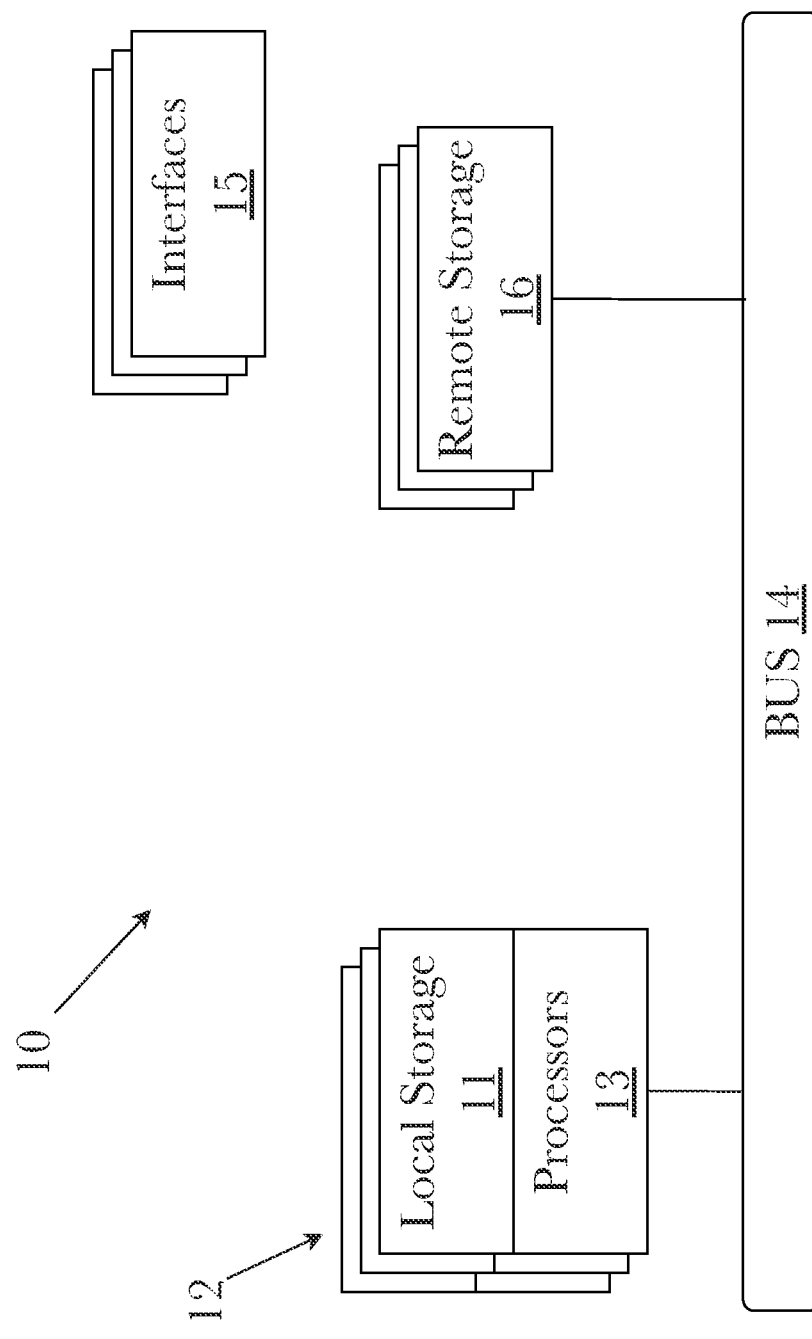
FIG. 18 is a block diagram illustrating an exemplary hardware architecture of a computing device.

Referring now to FIG. 18, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (Wi-Fi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 18 illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 19:
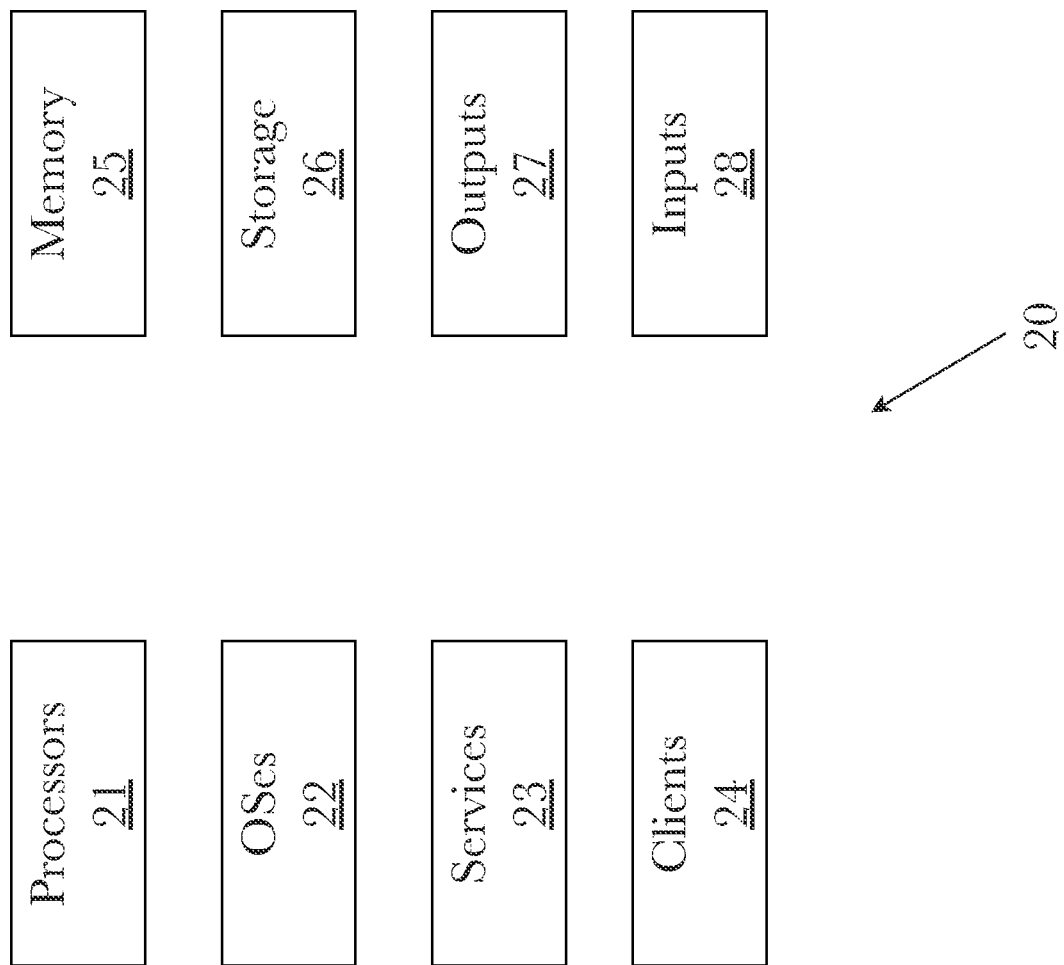
FIG. 19 is a block diagram illustrating an exemplary logical architecture for a client device.

In some embodiments, systems according to the present invention may be implemented on a standalone computing system. Referring now to FIG. 19, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of MICROSOFT WINDOWS™ operating system, APPLE OSX™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 18). Examples of storage devices 26 include flash memory, magnetic hard drive, CD-ROM, and/or the like.

Figure 20:
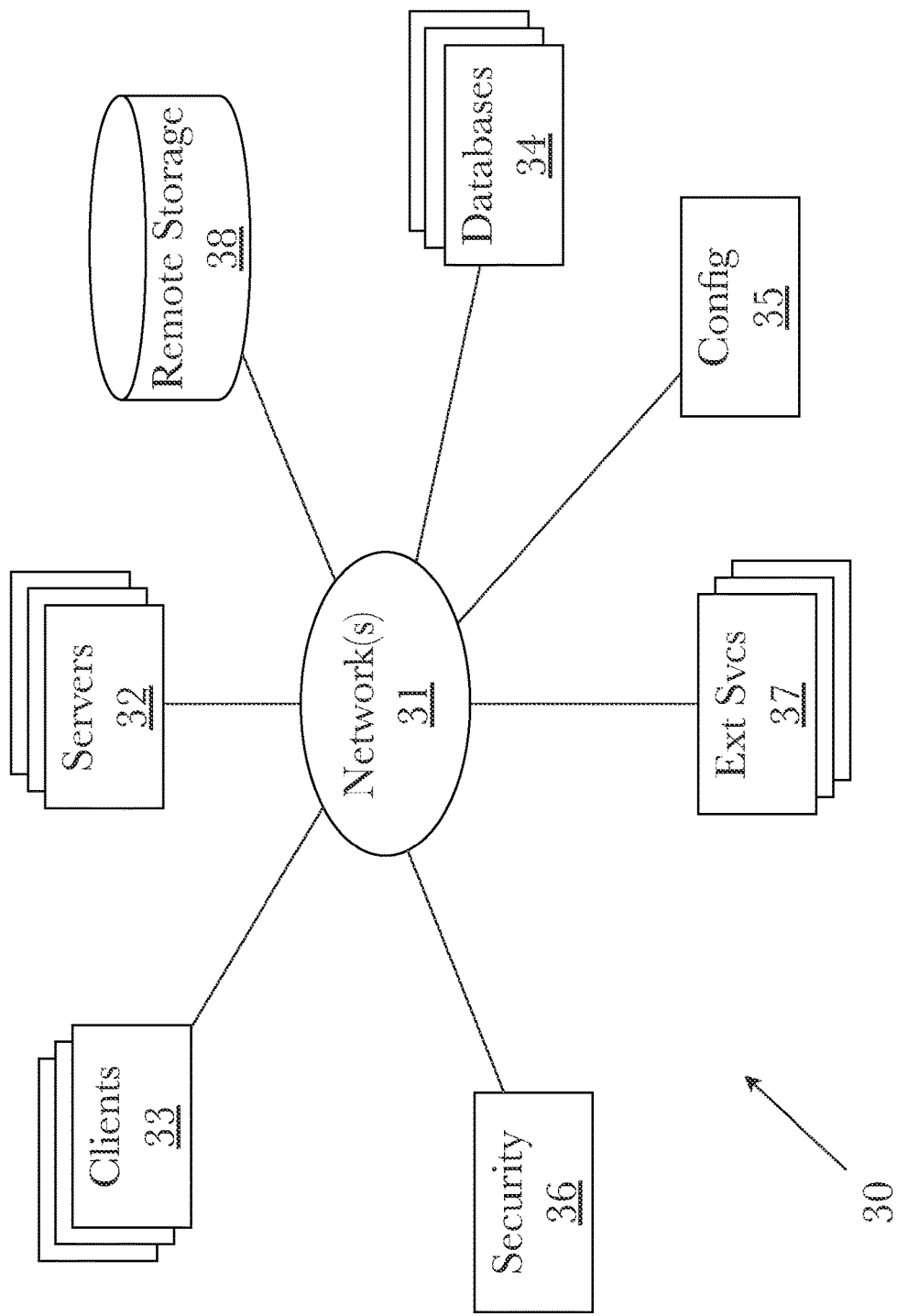
FIG. 20 is a block diagram showing an exemplary architectural arrangement of clients, servers, and external services.

In some embodiments, systems of the present invention may be implemented on a distributed computing network, such as one having any number of clients and/or servers. Referring now to FIG. 20, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated in FIG. 19. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 21:
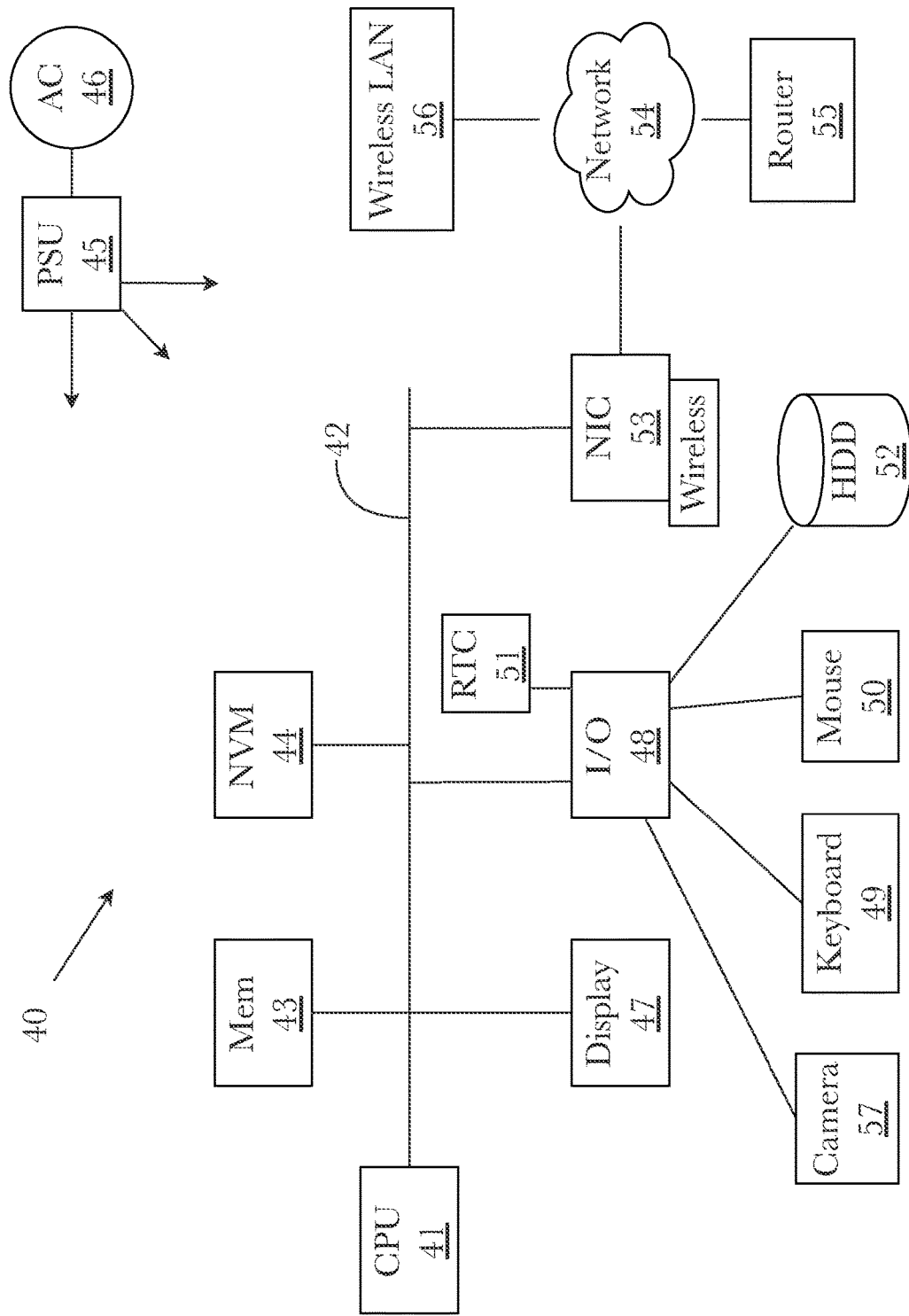
FIG. 21 is another block diagram illustrating an exemplary hardware architecture of a computing device.

FIG. 21 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

The skilled person will be aware of a range of possible modifications of the various embodiments described above. Accordingly, the present invention is defined by the claims and their equivalents.

What is claimed is:

1. An adaptive cloud conversation platform, comprising:
a computing device comprising a memory, a processor, and a non-volatile data storage device;
a consumer profile database stored on the non-volatile data storage device, the consumer profile database comprising one or more consumer profiles;
a conversation manager comprising a first plurality of programming instructions stored in the memory which, when operating on the processor, causes the computing device to:
receive a determination that a callback should be made to a consumer;
retrieve a consumer profile for the consumer from the consumer profile database, the consumer profile comprising a plurality of behaviors of the consumer and a plurality of preferences of the consumer;
process the plurality of preferences through a first machine learning algorithm to select a channel through which to conduct the callback with the consumer; and
forward the channel selection to a schedule manager;
a schedule manager comprising a second plurality of programming instructions stored in the memory which, when operating on the processor, causes the computing device to:
receive the channel selection from the conversation manager;
retrieve the consumer profile;
process the plurality of preferences through a second machine learning algorithm to select a time at which to conduct the callback with the consumer through the selected channel;
schedule a callback with the consumer at the selected time through the selected channel;
and forward the callback schedule to a callback manager; and
a callback manager comprising a third plurality of programming instructions stored in the memory which, when operating on the processor, causes the computing device to:
receive the callback schedule; and
execute the callback at the selected time through the selected channel as indicated in the callback schedule.

2. The platform of claim 1, further comprising a consumer context manager comprising a third plurality of programming instructions stored in the memory which, when operating on the processor, causes the computing device to:
receive text from a conversation with a consumer;
retrieve a consumer profile for the consumer from the consumer profile database, the consumer profile comprising a plurality of behaviors of the consumer and a plurality of preferences of the consumer;
process the text and the plurality of behaviors of the consumer through a third machine learning algorithm to determine whether a callback to the consumer should be made; and
where the determination is that a callback should be made, forward the determination to the conversation manager as the determination that a callback should be made to a consumer.

3. The platform of claim 2, further comprising a session manager comprising a fourth plurality of programming instructions stored in the memory which, when operating on the processor, causes the computing device to:
receive the text;
process the text through a fourth machine learning algorithm to determine a consumer sentiment; and
forward the determined sentiment to the consumer context manager as an additional input to the third machine learning algorithm's determination as to whether a callback to the consumer should be made.

4. The platform of claim 2, wherein:
the conversation manager is further configured to:
process the text through a fifth machine learning algorithm to determine a consumer goal, need, or intent; and
forward the determined goal, need, or intent to the consumer context manager as an additional input to the third machine learning algorithm's determination as to whether a callback to the consumer should be made.

5. The platform of claim 2, further comprising:
an event rules database stored on the non-volatile data storage device, the event rules database comprising rules for triggering communications with consumers based on events occurring outside of a conversation; and
an event manager comprising a fifth plurality of programming instructions stored in the memory which, when operating on the processor, causes the computing device to:
receive notification of an event;
match the event to a rule in the event rules database; and
forward the matched event to the conversation manager as the determination that a callback should be made to the consumer.

6. The platform of claim 5, wherein:
the event manager is further configured to:
retrieve the consumer profile for the consumer from the consumer profile database;
process the consumer profile and one or more rules from the event rules database through a sixth machine learning algorithm to determine a new rule for triggering communications with the consumer; and
store the new rule in the event rules database.

7. The platform of claim 2, further comprising:
a brand environment database stored on the non-volatile data storage device, the brand environment database comprising brand information related to conversations with consumers of the brand;
an environment manager comprising a sixth plurality of programming instructions stored in the memory which, when operating on the processor, causes the computing device to:
retrieve a consumer profile for a consumer from the consumer profile database;
retrieve the brand information from the brand environment database;
process the consumer profile and the brand information through a seventh machine learning algorithm to determine whether a campaign of communications should be established with a plurality of consumers; and
forward the determination to the conversation manager as the determination that a callback should be made to the consumer.

8. The platform of claim 7, further comprising:
a consumer manager comprising a seventh plurality of programming instructions stored in the memory which, when operating on the processor, causes the computing device to:
retrieve the consumer profile for the consumer from the consumer profile database;
receive a fitness parameter from the environment manager;
process the consumer profile and the fitness parameter through an eighth machine learning algorithm to identify opportunities for proactive conversations with the consumer; and
forward the identified to the consumer context manager as an additional input to the first machine learning algorithm's selection of the channel through which the callback should be made.

9. A method for operating an adaptive cloud conversation platform, comprising the steps of:
using a conversation manager operating on a computing device comprising a memory, a processor, and a non-volatile data storage device to:
receive a determination that a callback should be made to a consumer;
retrieve a consumer profile for the consumer from the consumer profile database stored on the non-volatile data storage device, the consumer profile database comprising one or more consumer profiles, and the consumer profile comprising a plurality of behaviors of the consumer and a plurality of preferences of the consumer;
process the plurality of preferences through a first machine learning algorithm to select a channel through which to conduct the callback with the consumer; and
forward the channel selection to a schedule manager;
using a schedule manager operating on the computing device to:
receive the channel selection from the conversation manager;
retrieve the consumer profile;
process the plurality of preferences through a second machine learning algorithm to select a time at which to conduct the callback with the consumer through the selected channel;
schedule a callback with the consumer at the selected time through the selected channel; and
forward the callback schedule to a callback manager; and
using a callback manager operating on the computing device:
receive the callback schedule; and
execute the callback at the selected time through the selected channel as indicated in the callback schedule.

10. The method of claim 9, further comprising the steps of using a consumer context manager operating on the computing device to:
receive text from a conversation with a consumer;
retrieve a consumer profile for the consumer from the consumer profile database, the consumer profile comprising a plurality of behaviors of the consumer and a plurality of preferences of the consumer;
process the text and the plurality of behaviors of the consumer through a third machine learning algorithm to determine whether a callback to the consumer should be made; and
where the determination is that a callback should be made, forward the determination to the conversation manager as the determination that a callback should be made to a consumer.

11. The method of claim 10, further comprising the steps of using a session manager operating on the computing device to:
receive the text;
process the text through a fourth machine learning algorithm to determine a consumer sentiment; and
forward the determined sentiment to the consumer context manager as an additional input to the third machine learning algorithm's determination as to whether a callback to the consumer should be made.

12. The method of claim 10, further comprising the steps of configuring the conversation manager to:

process the text through a fifth machine learning algorithm to determine a consumer goal, need, or intent; and forward the determined goal, need, or intent to the consumer context manager as an additional input to the third machine learning algorithm's determination as to whether a callback to the consumer should be made.

13. The method of claim 10, further comprising the steps of:
   using an event manager operating on the computing device to:
      receive notification of an event;
      match the event to a rule in the event rules database stored on the non-volatile data storage device, the event rules database comprising rules for triggering communications with consumers based on events occurring outside of a conversation; and
   forward the matched event to the conversation manager as the determination that a callback should be made to the consumer.

14. The method of claim 13, further comprising the steps of configuring the event manager to:
   retrieve the consumer profile for the consumer from the consumer profile database;
   process the consumer profile and one or more rules from the event rules database through a sixth machine learning algorithm to determine a new rule for triggering communications with the consumer; and
   store the new rule in the event rules database.

15. The method of claim 10, further comprising the steps of:
   using an environment manager operating on the computing device to:
      retrieve a consumer profile for a consumer from the consumer profile database;
      retrieve brand information from a brand environment database stored on the non-volatile data storage device, the brand environment database comprising brand information related to conversations with consumers of the brand;
      process the consumer profile and the brand information through a seventh machine learning algorithm to determine whether a campaign of communications should be established with a plurality of consumers; and
      forward the determination to the conversation manager as the determination that a callback should be made to the consumer.

16. The method of claim 15, further comprising the steps of:
   using a consumer manager operating on the computing device to:
      retrieve the consumer profile for the consumer from the consumer profile database;
      receive a fitness parameter from the environment manager;
      process the consumer profile and the fitness parameter through an eighth machine learning algorithm to identify opportunities for proactive conversations with the consumer; and
      forward the identified to the consumer context manager as an additional input to the first machine learning algorithm's selection of the channel through which the callback should be made.

* * * * *